US012800712B2

(12) United States Patent
Sekiya et al.

(10) Patent No.: US 12,800,712 B2
(45) Date of Patent: Nov. 17, 2026

(54) RADAR SYSTEM, METHOD, AND STORAGE MEDIUM

(71) Applicant: KABUSHIKI KAISHA TOSHIBA, Tokyo (JP)

(72) Inventors: Ryota Sekiya, Kamakura Kanagawa (JP); Hiroki Mori, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 202 days.

(21) Appl. No.: 18/763,383

(22) Filed: Jul. 3, 2024

(65) Prior Publication Data

US 2025/0093463 A1 Mar. 20, 2025

(30) Foreign Application Priority Data

Sep. 20, 2023 (JP) ................................ 2023-151904

(51) Int. Cl.
*G01S 7/35* (2006.01)
*G01S 7/02* (2006.01)
(Continued)

(52) U.S. Cl.
CPC .............. *G01S 7/352* (2013.01); *G01S 7/027* (2021.05); *G01S 13/46* (2013.01); *G01S 13/887* (2013.01);
(Continued)

(58) Field of Classification Search
CPC ........ G01S 7/352; G01S 13/895; G01S 7/027; G01S 13/46; G01S 13/887;
(Continued)

(56) References Cited

U.S. PATENT DOCUMENTS 5,661,490 A * 8/1997 McEwan .................. G08G 1/04 342/465
5,717,399 A * 2/1998 Urabe ...................... H01Q 3/24 342/87
(Continued)

FOREIGN PATENT DOCUMENTS

DE 102016101183 A1 * 8/2016 ............. G01S 7/023
EP 4431972 A1 * 9/2024 ........... G01S 13/931
(Continued)

OTHER PUBLICATIONS

Japanese Office Action (and an English language translation thereof) dated Mar. 3, 2026, issued in corresponding Japanese Application No. 2023-151904.
(Continued)

*Primary Examiner* — Nuzhat Pervin
(74) *Attorney, Agent, or Firm* — Holtz, Holtz & Volek PC

(57) ABSTRACT

According to one embodiment, a radar system includes first radar modules, second radar modules, and a processor. The processor causes one of the first radar modules to transmit one first radar signal and at least one second radar module of the second radar modules to transmit at least one second radar signal. A distance between the one of the first radar modules and the at least one second radar module is twice or more as long as a distance between the one of the first radar modules and a furthest point from the one of the first radar modules in a sensing area of the one of the first radar modules.

12 Claims, 21 Drawing Sheets

(51) Int. Cl.
*G01S 13/46* (2006.01)
*G01S 13/88* (2006.01)
*G01S 13/89* (2006.01)

(52) U.S. Cl.
CPC ....... *G01S 13/895* (2019.05); *G01S 2013/466* (2013.01)

(58) Field of Classification Search
CPC ............. G01S 2013/466; G01S 7/4815; G01S 13/003; G01S 13/584; G01S 13/87; G01S 7/411
USPC .......................................................... 342/128
See application file for complete search history.

(56) References Cited

U.S. PATENT DOCUMENTS

| | | | | |
|---|---|---|---|---|
| 9,335,405 | B2 * | 5/2016 | Durand | G01S 13/933 |
| 9,551,782 | B2 * | 1/2017 | Yanagi | G01S 7/4008 |
| 10,673,149 | B2 * | 6/2020 | Kishigami | G01S 13/284 |
| 11,209,546 | B1 * | 12/2021 | Eldada | G01S 17/89 |
| 11,796,662 | B2 * | 10/2023 | Lee | G01S 7/41 |
| 12,146,978 | B2 * | 11/2024 | Iwasa | G01S 7/285 |
| 2013/0229116 | A1 | 9/2013 | Van Zeijl et al. | |
| 2013/0229297 | A1 * | 9/2013 | Mukai | G01S 13/42 342/92 |
| 2013/0285848 | A1 * | 10/2013 | Grau Besoli | H01Q 3/40 342/134 |
| 2014/0197983 | A1 * | 7/2014 | Reuter | G01S 13/343 342/175 |
| 2014/0354468 | A1 * | 12/2014 | Yanagi | G01S 7/4008 342/173 |
| 2015/0355318 | A1 * | 12/2015 | Durand | G01S 13/02 342/5 |
| 2018/0136312 | A1 * | 5/2018 | Fetterman | G01S 13/931 |
| 2019/0324108 | A1 * | 10/2019 | Wittenberg | G01S 13/003 |
| 2019/0369232 | A1 * | 12/2019 | Yu | G01S 13/04 |
| 2019/0383901 | A1 * | 12/2019 | Elad | G01S 13/42 |
| 2020/0300995 | A1 * | 9/2020 | Wu | G01S 13/003 |
| 2021/0278519 | A1 | 9/2021 | Mori | |
| 2022/0187450 | A1 * | 6/2022 | Vollbracht | G01S 13/32 |
| 2022/0317282 | A1 * | 10/2022 | Robertson | G01S 7/027 |
| 2022/0404457 | A1 * | 12/2022 | Mori | G01S 7/032 |
| 2023/0079273 | A1 | 3/2023 | Tsujimura et al. | |
| 2024/0094370 | A1 * | 3/2024 | Seki | G01S 13/34 |
| 2024/0219515 | A1 * | 7/2024 | Wu | G01S 13/931 |
| 2024/0291167 | A1 * | 8/2024 | Kishigami | G01S 13/003 |
| 2024/0377518 | A1 * | 11/2024 | Iwasa | G01S 13/878 |

FOREIGN PATENT DOCUMENTS

| | | | | |
|---|---|---|---|---|
| JP | 2010169432 A | | 8/2010 | |
| JP | 2014501020 A | | 1/2014 | |
| JP | 2020115107 A | | 7/2020 | |
| JP | 2023000084 A | | 1/2023 | |
| JP | 2023043026 A | | 3/2023 | |
| JP | 2023107802 A | | 8/2023 | |
| JP | 2024044193 A | | 4/2024 | |
| WO | 2019199857 A1 | | 10/2019 | |
| WO | WO-2021108361 A1 | * | 6/2021 | G06V 20/52 |

OTHER PUBLICATIONS

Extended European Search Report (EESR) dated Dec. 19, 2024, issued in counterpart European Application No. 24186497.4.

* cited by examiner

| Path | Transmitter module | Transmit antennas | | | | | | | | | | | | | | | | |
|---|---|---|---|---|---|---|---|---|---|---|---|---|---|---|---|---|---|---|
| $142_1$ | 10a | 16a | ○ | | | | | | | | | | | | | | | |
| | | 16b | | ○ | | | | | | | | | | | | | | |
| | | ⋯ | | | ⋯ | | | | | | | | | | | | | |
| | 10b | 16a | | | | ○ | | | | | | | | | | | | |
| | | ⋯ | | | | | ⋯ | | | | | | | | | | | |
| | ⋯ | ⋯ | | | | | | ⋯ | | | | | | | | | | |
| | 10d | 16a | | | | | | | ○ | | | | | | | | | |
| | ⋯ | ⋯ | | | | | | | | ⋯ | | | | | | | | |
| $142_2$ | 10a | 16a | | | | | | | | | ○ | | | | | | | |
| | | 16b | | | | | | | | | | ○ | | | | | | |
| | | ⋯ | | | | | | | | | | | ⋯ | | | | | |
| | 10b | 16a | | | | | | | | | | | | ○ | | | | |
| | | ⋯ | | | | | | | | | | | | | ⋯ | | | |
| | ⋯ | ⋯ | | | | | | | | | | | | | | ⋯ | | |
| | 10d | 16a | | | | | | | | | | | | | | | ○ | |
| | ⋯ | ⋯ | | | | | | | | | | | | | | | | ⋯ |
| | Receiver module | Receive antennas | | | | | | | | | | | | | | | | |
| $142_1$ | 20a | 26a | ○ | ○ | ⋯ | ○ | ⋯ | ⋯ | ○ | ⋯ | | | | | | | | |
| | | 26b | ○ | ○ | ⋯ | ○ | ⋯ | ⋯ | ○ | ⋯ | | | | | | | | |
| | | ⋯ | ○ | ○ | ⋯ | ○ | ⋯ | ⋯ | ○ | ⋯ | | | | | | | | |
| | 20b | 26a | ○ | ○ | ⋯ | ○ | ⋯ | ⋯ | ○ | ⋯ | | | | | | | | |
| | | ⋯ | ○ | ○ | ⋯ | ○ | ⋯ | ⋯ | ○ | ⋯ | | | | | | | | |
| | ⋯ | ⋯ | ⋯ | ⋯ | ⋯ | ⋯ | ⋯ | ⋯ | ⋯ | ⋯ | | | | | | | | |
| | 20d | 26a | ○ | ○ | ⋯ | ○ | ⋯ | ⋯ | ○ | ⋯ | | | | | | | | |
| | | ⋯ | ○ | ○ | ⋯ | ○ | ⋯ | ⋯ | ○ | ⋯ | | | | | | | | |
| $142_2$ | 20a | 26a | | | | | | | | | ○ | ○ | ⋯ | ○ | ⋯ | ⋯ | ○ | ⋯ |
| | | 26b | | | | | | | | | ○ | ○ | ⋯ | ○ | ⋯ | ⋯ | ○ | ⋯ |
| | | ⋯ | | | | | | | | | ○ | ○ | ⋯ | ○ | ⋯ | ⋯ | ○ | ⋯ |
| | 20b | 26a | | | | | | | | | ○ | ○ | ⋯ | ○ | ⋯ | ⋯ | ○ | ⋯ |
| | | ⋯ | | | | | | | | | ○ | ○ | ⋯ | ○ | ⋯ | ⋯ | ○ | ⋯ |
| | | ⋯ | | | | | | | | | ⋯ | ⋯ | ⋯ | ⋯ | ⋯ | ⋯ | ⋯ | ⋯ |
| | 20d | 26a | | | | | | | | | ○ | ○ | ⋯ | ○ | ⋯ | ⋯ | ○ | ⋯ |
| | | ⋯ | | | | | | | | | ○ | ○ | ⋯ | ○ | ⋯ | ⋯ | ○ | ⋯ |

FIG. 16

| Path | Transmitter module | Transmit antennas | | | | | | | | |
|---|---|---|---|---|---|---|---|---|---|---|
| $142_1$ | 10a | 16a | ○ | | | | | | | |
| | | 16b | | ○ | | | | | | |
| | | ··· | | | ··· | | | | | |
| | 10b | 16a | | | | ○ | | | | |
| | | ··· | | | | | ··· | | | |
| | ··· | ··· | | | | | | ··· | | |
| | 10d | 16a | | | | | | | ○ | |
| | ··· | ··· | | | | | | | | ··· |
| $142_2$ | 10a | 16a | ○ | | | | | | | |
| | | 16b | | ○ | | | | | | |
| | | ··· | | | ··· | | | | | |
| | 10b | 16a | | | | ○ | | | | |
| | | ··· | | | | | ··· | | | |
| | ··· | ··· | | | | | | ··· | | |
| | 10d | 16a | | | | | | | ○ | |
| | ··· | ··· | | | | | | | | ··· |
| | Receiver module | Receive antennas | | | | | | | | |
| $142_1$ | 20a | 26a | ○ | ○ | ··· | ○ | ··· | ··· | ○ | ··· |
| | | 26b | ○ | ○ | ··· | ○ | ··· | ··· | ○ | ··· |
| | | ··· | ○ | ○ | ··· | ○ | ··· | ··· | ○ | ··· |
| | 20b | 26a | ○ | ○ | ··· | ○ | ··· | ··· | ○ | ··· |
| | | ··· | ○ | ○ | ··· | ○ | ··· | ··· | ○ | ··· |
| | ··· | ··· | ··· | ··· | ··· | ··· | ··· | ··· | ··· | ··· |
| | 20d | 26a | ○ | ○ | ··· | ○ | ··· | ··· | ○ | ··· |
| | | ··· | ○ | ○ | ··· | ○ | ··· | ··· | ○ | ··· |
| $142_2$ | 20a | 26a | ○ | ○ | ··· | ○ | ··· | ··· | ○ | ··· |
| | | 26b | ○ | ○ | ··· | ○ | ··· | ··· | ○ | ··· |
| | | ··· | ○ | ○ | ··· | ○ | ··· | ··· | ○ | ··· |
| | 20b | 26a | ○ | ○ | ··· | ○ | ··· | ··· | ○ | ··· |
| | | ··· | ○ | ○ | ··· | ○ | ··· | ··· | ○ | ··· |
| | ··· | ··· | ··· | ··· | ··· | ··· | ··· | ··· | ··· | ··· |
| | 20d | 26a | ○ | ○ | ··· | ○ | ··· | ··· | ○ | ··· |
| | | ··· | ○ | ○ | ··· | ○ | ··· | ··· | ○ | ··· |

FIG. 17

RADAR SYSTEM, METHOD, AND STORAGE MEDIUM

CROSS-REFERENCE TO RELATED APPLICATIONS

This application is based upon and claims the benefit of priority from Japanese Patent Application No. 2023-151904, filed Sep. 20, 2023, the entire contents of which are incorporated herein by reference.

FIELD

Embodiments described herein relate generally to a radar system, a method, and a storage medium.

BACKGROUND

An Integrated circuit having a radar function has been commercialized, and a radar device has become available at low cost. The radar device is expected to be applied to various fields such as automobiles, non-destructive inspection, medical, and security.

In the commercialized integrated circuit having the radar function, the number of antennas that can be mounted on is small. Therefore, increase of an aperture length of an antenna array is limited, and thus it is difficult to increase a spatial resolution.

In order to increase the number of applications of the radar device, it is desired that the aperture length of the antenna array can be adjusted and increased easily. As an example, it is proposed to provide a plurality of antenna modules. A plurality of integrated circuits and the antenna arrays are mounted on the antenna module.

When the number of the antennas increases in association with the increase of the aperture length of the antenna array, the required installation space becomes larger and the installation of a plurality of antenna modules becomes difficult.

BRIEF DESCRIPTION OF THE DRAWINGS

FIG. 16 is a diagram illustrating an example of a transmission/reception sequence of the inspection device according to the embodiment.

FIG. 17 illustrates another example of the transmission/reception sequence of the inspection device according to the embodiment.

DETAILED DESCRIPTION

Figure 1:
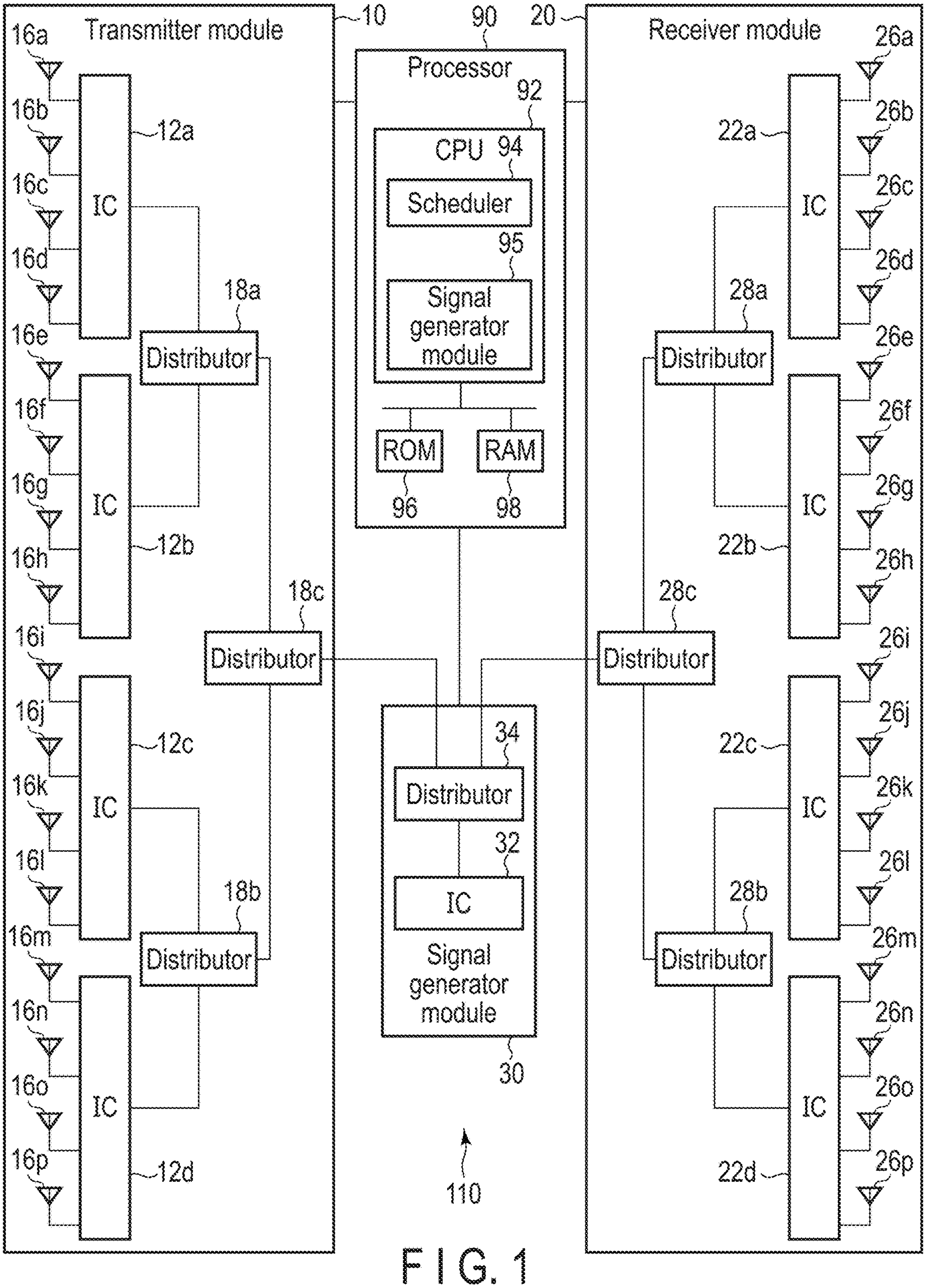
FIG. 1 is a block diagram showing an example of a radar device according to an embodiment.

Embodiments will be described below with reference to the drawings. In the following descriptions, a device and a method are illustrated to embody the technical concept of the embodiments. The technical concept is not limited to the configuration, shape, arrangement, material or the like of the structural elements described below. Modifications that could easily be conceived by a person with ordinary skill in the art are naturally included in the scope of the disclosure. To make the descriptions clearer, the drawings may schematically show the size, thickness, planer dimension, shape, and the like of each element differently from those in the actual aspect. The drawings may include elements that differ in dimension and ratio. Elements corresponding to each other are denoted by the same reference numeral and their overlapping descriptions may be omitted. Some elements may be denoted by different names, and these names are merely an example. It should not be denied that one element is denoted by different names. Note that "connection" means that one element is connected to another element via still another element as well as that one element is directly connected to another element. If the number of elements is not specified as plural, the elements may be singular or plural.

In general, according to one embodiment, a radar system includes first radar modules capable of transmitting first radar signals to a first area, respectively, and capable of receiving first reflected signals obtained by reflecting the first radar signals by a first inspection target in the first area, second radar modules capable of transmitting second radar signals to a second area, respectively, and capable of receiving second reflected signals obtained by reflecting the second radar signals by a second inspection target in the second area, and a processor configured to control transmission timings of the first radar modules and transmission timings of the second radar modules. The processor is configured to cause one of the first radar modules to transmit one first radar signal and cause at least one second radar module of the second radar modules to transmit at least one second radar signal. A distance between the one of the first radar modules and the at least one second radar module is twice or more as long as a distance between the one of the first radar modules and a furthest point from the one of the first radar modules in a sensing area of the one of the first radar modules.

FIG. 1 is a block diagram illustrating an example of a radar device 110 according to an embodiment. The radar device 110 includes at least one module. At least one integrated circuit having a radar function is mounted on the module. An example of the module is a transmit antenna module having a transmission function (hereinafter referred to as a transmitter module) 10, a receive antenna module having a reception function (hereinafter referred to as a receiver module) 20, and a signal generator module 30 generating a reference signal and a clock signal. FIG. 1 shows an example including one transmitter module 10 and one receiver module 20. The embodiment includes an example including transmitter modules 10 and receiver modules 20. By connecting the transmitter modules 10 and the receiver modules 20 so as to be connected to the signal generator module 30, the synchronous control of a plurality of integrated circuits and the adjustment or the increase of the aperture length of an antenna array can be easily achieved.

The radar device 110 further includes a processor 90. The processor 90 is connected to the transmitter module 10, the receiver module 20, and the signal generator module 30. The processor 90 includes a CPU 92, a ROM 96, and a RAM 98. The ROM 96 is a non-transitory computer-readable storage medium. The ROM 96 stores a computer program which is executable by the CPU 92 for controlling the radar device 110. The RAM 98 temporarily stores various data that are in operation. The CPU 92 executes program to have a function of a scheduler 94. The scheduler 94 generates a trigger signal to control the transmission timing.

The signal generator module 30 generates a signal to control the transmission and reception of the radar signal according to a radar scheme. An example of the radar scheme is a linear frequency modulated continuous wave (L-FMCW) scheme in which the frequency increases linearly as time passes. The signal generator module 30 includes a distributor 34 and an integrated circuit (hereinafter referred to as an IC) 32 having the radar function of the L-FMCW scheme. Other examples of the radar scheme include a non-modulation CW scheme and a pulse scheme. Embodiments are not limited to these radar schemes and are applied to other radar schemes.

The IC 32 generates the clock signal and an L-FMCW signal (hereinafter referred to as a chirp signal) as the reference signal. When it is unnecessary to distinguish the chirp signal and the clock signal from each other, these signals are simply referred to as "signal".

The transmitter module 10 and the receiver module 20 operate according to the clock signal output by the signal generator module 30. Therefore, the transmitter module 10 and the receiver module 20 operate in synchronization with each other.

An output signal of the IC 32 is input to the distributor 34. The distributor 34 distributes the input signal to two output terminals. A first output signal of the distributor 34 is supplied to the transmitter module 10. A second output signal of the distributor 34 is supplied to the receiver module 20. Since the clock signal from the single signal generator module 30 is supplied to the transmitter module 10 and the receiver module 20, a transmission and a reception are synchronized.

The transmitter module 10 includes transmit antennas 16, at least two ICs 12, and at least one distributor 18. The IC 12 has a radar transmission function according to the L-FMCW scheme. The transmitter module 10 may comprise a substrate (not shown). The ICs 12, the transmit antennas 16, and the distributor 18 may be formed on the substrate. The number of the ICs12 is, for example, four. The number of the transmit antennas 16 is, for example, sixteen. The number of the distributors 18 is, for example, three. The distributor 18 distributes the input signal to the two output terminals.

The signal from the distributor 34 is input to a distributor 18*c*. The distributor 18*c* distributes the input signal to two output terminals. The first output signal of the distributor 18*c* is input to a distributor 18*a*. The second output signal of the distributor 18*c* is input to a distributor 18*b*.

The distributor 18*a* distributes the input signal to two output terminals. The first output signal of the distributor 18*a* is input to an IC 12*a*. The second output signal of the distributor 18*a* is input to an IC 12*b*. The IC 12*a* is connected to four transmit antennas 16*a*, 16*b*, 16*c*, and 16*d*. The IC 12*b* is connected to four transmit antennas 16*e*, 16*f*, 16*g*, and 16*h*.

The distributor 18*b* distributes the input signal to two output terminals. The first output signal of the distributor 18*b* is input to an IC 12*c*. The second output signal of the distributor 18*b* is input to the IC 12*d*. The IC 12*c* is connected to four transmit antennas 16*i*, 16*j*, 16*k*, and 16*l*. The IC 12*d* is connected to four transmit antennas 16*m*, 16*n*, 16*o*, and 16*p*.

The clock signal from the signal generator module 30 is supplied to the ICs 12*a* to 12*d*. The transmissions of the ICs 12*a* to 12*d* are synchronized based on the clock signal. The IC 12*a* causes the transmit antennas 16*a* to 16*d* to transmit electromagnetic waves corresponding to the chirp signal (hereinafter referred to as a radar signal) to an object. The IC 12*b* causes the transmit antennas 16*e* to 16*h* to transmit the electromagnetic waves corresponding to the radar signal to the object. The IC 12*c* causes the transmit antennas 16*i* to 16*l* to transmit the electromagnetic waves corresponding to the radar signal to the object. The IC 12*d* causes the transmit antennas 16*m* to 16*p* to transmit the electromagnetic waves corresponding to the radar signal to the object.

The number of the transmit antennas 16 connected to each of the ICs 12*a* to 12*d* is not limited to four, but may be two, six or more, or an odd number. The number of the transmit antennas 16 connected to each of the ICs 12*a* to 12*d* is not limited to the same but may be different for each of the ICs 12. The intervals between all of adjacent antennas (for example, 16*a* and 16*b*) of the transmit antennas 16*a* to 16*p* may be set to uniform intervals or may be set to a plurality of intervals relatively prime to each other. An example of the uniform interval is one wavelength or a half wavelength of one of electromagnetic wave frequencies of transmission frequency range. An example of the uniform interval is one wavelength or a half wavelength of a central frequency of the transmission frequency range.

The receiver module 20 includes receive antennas 26, at least two ICs 22, and at least one distributor 28. The IC 22 has a radar reception function of the L-FMCW scheme. The receiver module 20 includes a substrate (not shown). The ICs 22, receive antennas 26, and distributor 28 may be formed on the substrate. The number of the ICs 22 is, for example, four. The number of the receive antennas 26 is, for example, sixteen. The number of the distributors 28 is, for example, three. The distributor 28 distributes the input signal to two output terminals.

The signal from the distributor 34 is input to a distributor 28*c*. The distributor 28*c* distributes the input signal to two output terminals. The first output signal of the distributor 28*c* is input to a distributor 28*a*. The second output signal of the distributor 28*c* is input to a distributor 28*b*.

The distributor 28*a* distributes the input signal to two output terminals. The first output signal of the distributor 28*a* is input to an IC 22*a*. The second output signal of the distributor 28*a* is input to an IC 22*b*. The IC 22*a* is connected to four transmit antennas 26*a*, 26*b*, 26*c*, and 26*d*. The IC 22*b* is connected to four receive antennas 26*e*, 26*f*, 26*g*, and 26*h*.

The distributor 28*b* distributes the input signal to two output terminals. The first output signal of the distributor 28*b* is input to the IC 22*c*. The second output signal of the distributor 28*b* is input to the IC 22*d*. The IC 22*c* is connected to four receive antennas 26*i*, 26*j*, 26*k*, and 26*l*. The IC 22*d* is connected to four receive antennas 26*m*, 26*n*, 26*o*, and 26*p*.

The clock signal from the signal generator module 30 is supplied to the ICs 22*a* to 22*d*. The ICs 22*a* to 22*d* perform the synchronized reception based on the clock signal. The IC 22*a* processes the signals received by the receive antennas 26*a* to 26*d* according to the chirp signal. The IC 22*b* processes the signals received by the receive antennas 26*e* to 26*h* according to the chirp signal. The IC 22*c* processes the signals received by the receive antennas 26*i* to 26*l* according to the chirp signal. The IC 22*d* processes the signals received by the receive antennas 26*m* to 26*p* according to the chirp signal.

The number of the receive antennas 26 connected to each of the ICs 22*a* to 22*d* is not limited to four, but may be two, six or more, or an odd number. The number of the receive antennas 26 connected to each of the ICs 22*a* to 22*d* is not limited to the same number, but may be different for each of the IC. The intervals between all of adjacent antennas 26 (for example, 26*a* and 26*b*) of the receive antennas 26*a* to 26*p* may be set to uniform intervals or may be set to a plurality of intervals relatively prime to each other. An example of the uniform interval is the one wavelength or the half wavelength.

The transmitter module 10, the receiver module 20, and the signal generator module 30 are connected to the processor 90. The processor 90 is an upper layer device of the radar device 110. The processor 90 may perform a process, e.g., a beam-forming process of a transmission beam and a reception beam. The processor 90 performs an initial setting and a timing control of the transmitter module 10. The processor 90 can perform an array signal processing of the received signal to detect the presence or absence of belongings, the direction of the belongings, the distance to the belongings, and the type of belongings and may display an image of the belongings. In that case, the CPU 92 has a function of an image generator module in addition to the function of the scheduler 94.

The spatial resolution required for the direction estimation and the image display of the radar device 110 using the antenna array including a plurality of antennas is determined depending on the number of the antennas. Only a limited number of the antennas can be connected to the single IC 12 or 22 that has the radar function. Thus, the spatial resolution cannot be increased. In the embodiment, a plurality of ICs, for example, four ICs 12*a* to 12*d*, are cascaded to realize a transmit antenna array including sixteen antennas 16*a* to 16*p*. A plurality of ICs, for example, four ICs 22*a* to 22*d*, are cascaded to realize a receive antenna array including sixteen antennas 26*a* to 26*p*. Each of the transmit antenna array and the receive antenna array is a multiple-input and multiple-output (MIMO) antenna. Thus, the spatial resolution of the radar device 110 can be quadruple of a spatial resolution of a case in which one IC 12 is used in the transmitter module 10 and one IC 22 is used in the receiver module 20.

A dedicated IC may be used as each of the ICs 12*a* to 12*d*, the ICs 22*a* to 22*d*, and the IC 32. However, the same IC may be used in common.

Figure 2:
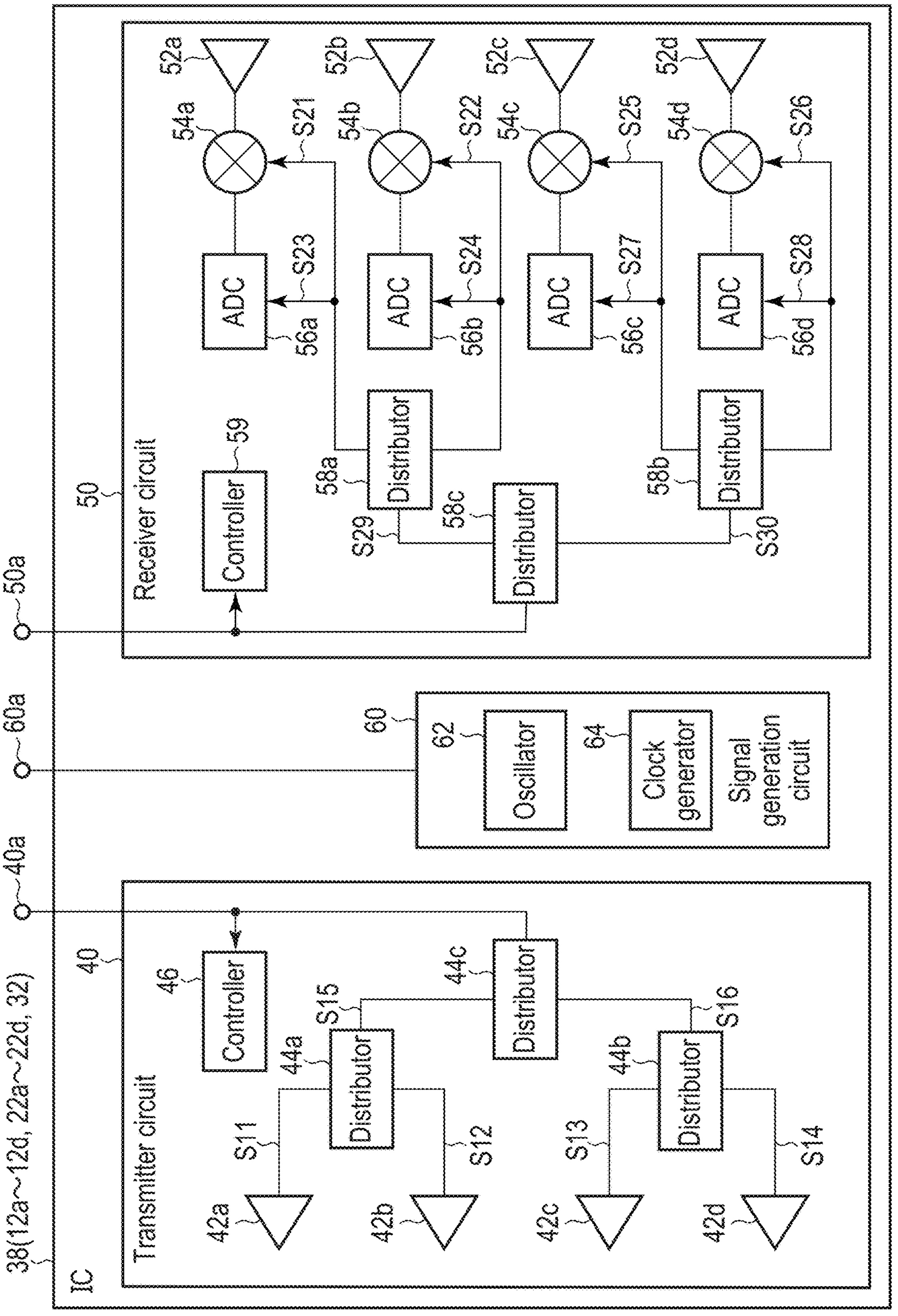
FIG. 2 is a block diagram illustrating an example of an IC according to the embodiment.

FIG. 2 is a block diagram illustrating an example of an IC 38 used in common as each of the ICs 12*a* to 12*d*, the ICs 22*a* to 22*d*, and the IC 32 according to the embodiment. The IC 38 includes a transmitter circuit 40, a receiver circuit 50, and a signal generation circuit 60.

The signal generation circuit 60 includes an oscillator 62 and a clock generator 64. The oscillator 62 generates the chirp signal. The output signal of the signal generation circuit 60 is output to the outside of the IC 38 via an output terminal 60*a*.

The transmitter circuit 40 includes transmission amplifiers 42*a*, 42*b*, 42*c*, and 42*d*, and distributors 44*a*, 44*b*, and 44*c*, and a controller 46. The chirp signal and the clock signal from the outside of the IC 38 are input to an input terminal 40*a*. The trigger signal from the processor 90 is input to the controller 46. The processor 90 supplies the trigger signal to the controller 46 of one the transmitter circuits 40, which initiates transmission.

The clock signal is input to the controller 46. The controller 46 controls the operation timing of each of the transmission amplifiers 42 based on the clock signal and the trigger signal. The chirp signal is input to the distributor 44*c*. The distributor 44*c* supplies the chirp signal to the distributor 44*a* and the distributor 44*b*. The distributor 44*a* supplies the chirp signal from the distributor 44*c* to the transmission amplifier 42*a* and the transmission amplifier 42*b*. The distributor 44*b* supplies the chirp signal from the distributor 44*c* to the transmission amplifier 42*c* and the transmission amplifier 42*d*.

Each of the transmission amplifiers 42*a* to 42*d* is connected to each of the four transmit antennas 16. As a result, the radar signal according to the chirp signal is irradiated from each of the four transmit antennas 16.

An example of the electromagnetic wave used as the radar signal in the embodiment is an electromagnetic wave having a wavelength of 1 to 30 millimeters. An electromagnetic wave having a wavelength of 1 to 10 millimeters is referred to as a millimeter wave. An electromagnetic wave having a wavelength of 10 to 100 millimeters is referred to as a microwave. Another example of the electromagnetic wave is an electromagnetic wave having a wavelength of 100 micrometers to 1 millimeter, which is referred to as a terahertz wave.

The distributor 44*a* is arranged at a position substantially equidistant from the transmission amplifier 42*a* and the transmission amplifier 42*b*. Therefore, the length of a signal line S11 between the distributor 44*a* and the transmission amplifier 42*a* can easily be made equal to the length of a signal line S12 between the distributor 44*a* and the transmission amplifier 42*b*. The distributor 44*b* is arranged at a position substantially equidistant from the transmission amplifier 42*c* and the transmission amplifier 42*d*. Therefore, the length of a signal line S13 between the distributor 44*b* and the transmission amplifier 42*c* can easily be made equal to the length of a signal line S14 between the distributor 44*b* and the transmission amplifier 42*d*. The distributor 44*c* is arranged at a position substantially equidistant from the distributor 44*a* and the distributor 44*b*. Therefore, the length of a signal line S15 between the distributor 44*c* and the distributor 44*a* can easily be made equal to the length of a signal line S16 between the distributor 44*c* and the distributor 44*b*.

By dividing the signal from the input terminal 40*a* into two signals by the distributor 44*c* and further dividing each of the two divided signals into two signals in this manner, the lengths of the signal lines between the input terminal 40*a* and the four transmission amplifiers 42*a* to 42*d* can easily be made equal. As a result, variation in the transmission delay of four chirp signals input to the four transmission amplifiers 42*a* to 42*d* can be suppressed and the directivity of the transmit antenna array can be accurately controlled. If the signal from the input terminal 40*a* is divided into four signals by one distributor, four signal lines need to be routed to make the lengths of the four signal lines equal, and thus the degree of integration of the IC 38 cannot be increased.

The receiver circuit 50 includes reception amplifiers 52*a*, 52*b*, 52*c*, and 52*d*, mixers 54*a*, 54*b*, 54*c*, and 54*d*, A/D converters (ADC) 56*a*, 56*b*, 56*c*, and 56*d*, distributors 58*a*, 58*b*, and 58*c*, and a controller 59. The chirp signal and the clock signal from the outside of the IC 38 are input to an input terminal 50*a*.

The clock signal is input to the controller 59. The controller 59 controls the operation timing of the receiver circuit 50 based on the clock signal. Thus, the operations of the transmitter circuit 40 and the receiver circuit 50 are synchronized. The controller 59 causes the reception amplifiers 52 connected to all of the receive antennas 26*a* to 26*p* to operate simultaneously.

The chirp signal is input to the distributor 58*c*. Each of the four receive antennas 26 is connected to each of the reception amplifiers 52*a* to 52*d*.

The outputs of the reception amplifiers 52*a* to 52*d* are supplied to the ADCs 56*a* to 56*d* via the mixers 54*a* to 54*d*, respectively.

The distributor 58*c* supplies the chirp signal and the clock signal from the input terminal 50*a* to the distributor 58*a* and the distributor 58*b*. The distributor 58*a* supplies the chirp signal from the distributor 58*c* to the mixers 54*a* and 54*b* and supplies the clock signal from the distributor 58*c* to the ADCs 56*a* and 56*b*. The distributor 58*b* supplies the chirp signal from the distributor 58*c* to the mixers 54*c* and 54*d* and also supplies the clock signal from the distributor 58*c* to the ADCs 56*c* and 56*d*.

The mixers 54*a* to 54*d* use the chirp signals to convert RF signals from the reception amplifiers 52*a* to 52*d* into IF-band received signals. The ADCs 56*a* to 56*d* synchronize the IF-band received signals with the clock signals and covert these synchronized signals to digital signals.

The digital signals from the ADCs 56*a* to 56*d* are supplied to the processor 90 via output terminals (not shown).

The distributor 58*a* is arranged at a position substantially equidistant from the mixer 54*a* and the mixer 54*b* and a position substantially equidistant from the ADC 56*a* and the ADC 56*b*. Therefore, the length of a signal line S21 between the distributor 58*a* and the mixer 54*a* can easily be made equal to the length of a signal line S22 between the distributor 58*a* and the mixer 54*b*. The length of a signal line S23 between the distributor 58*a* and the ADC 56*a* can easily be made equal to the length of a signal line S24 between the distributor 58*a* and the ADC 56*b*.

The distributor 58*b* is arranged at a position substantially equidistant from the mixer 54*c* and the mixer 54*d* and a position substantially equidistant from the ADC 56*c* and the ADC 56*d*. Therefore, the length of a signal line S25 between the distributor 58*b* and the mixer 54*c* can easily be made equal to the length of a signal line S26 between the distributor 58*b* and the mixer 54*d*. The length of a signal line S27 between the distributor 58*b* and the ADC 56*c* can easily be made equal to the length of a signal line S28 between the distributor 58*b* and the ADC 56*d*.

The distributor 58*c* is arranged at a position substantially equidistant from the distributor 58*a* and the distributor 58*b*. Therefore, the length of a signal line S29 between the distributor 58*c* and the distributor 58*a* can easily be made equal to the length of a signal line S30 between the distributor 58*c* and the distributor 58*b*.

Thus, by dividing the signal from the input terminal 50*a* into two signals by the distributor 58*c* and further dividing each of the two divided signals into two signals, the lengths of the signal lines between the input terminal 50*a* and the four mixers 54*a* to 54*d* can easily be made equal and the length of the signal lines between the input terminal 50*a* and the four ADCs 56*a* to 56*d* can easily be made equal. As a result, variation in the transmission delay of four chirp signals respectively input to the four mixers 54*a* to 54*d* can be suppressed and the RF signals can be converted into IF signals without the occurrence of the phase shift. Furthermore, variation in the timing deviations of four clock signals respectively input to the four ADCs 56*a* to 56*d* can be suppressed, and the IF signals can be converted to the digital signals at correct timing. If the signal from the input terminal 50*a* is divided into four signal lines, the four signal lines need to be routed in order to make the lengths of the four signal lines equal. Thus, the degree of integration of the IC 38 cannot be increased.

Figure 3:
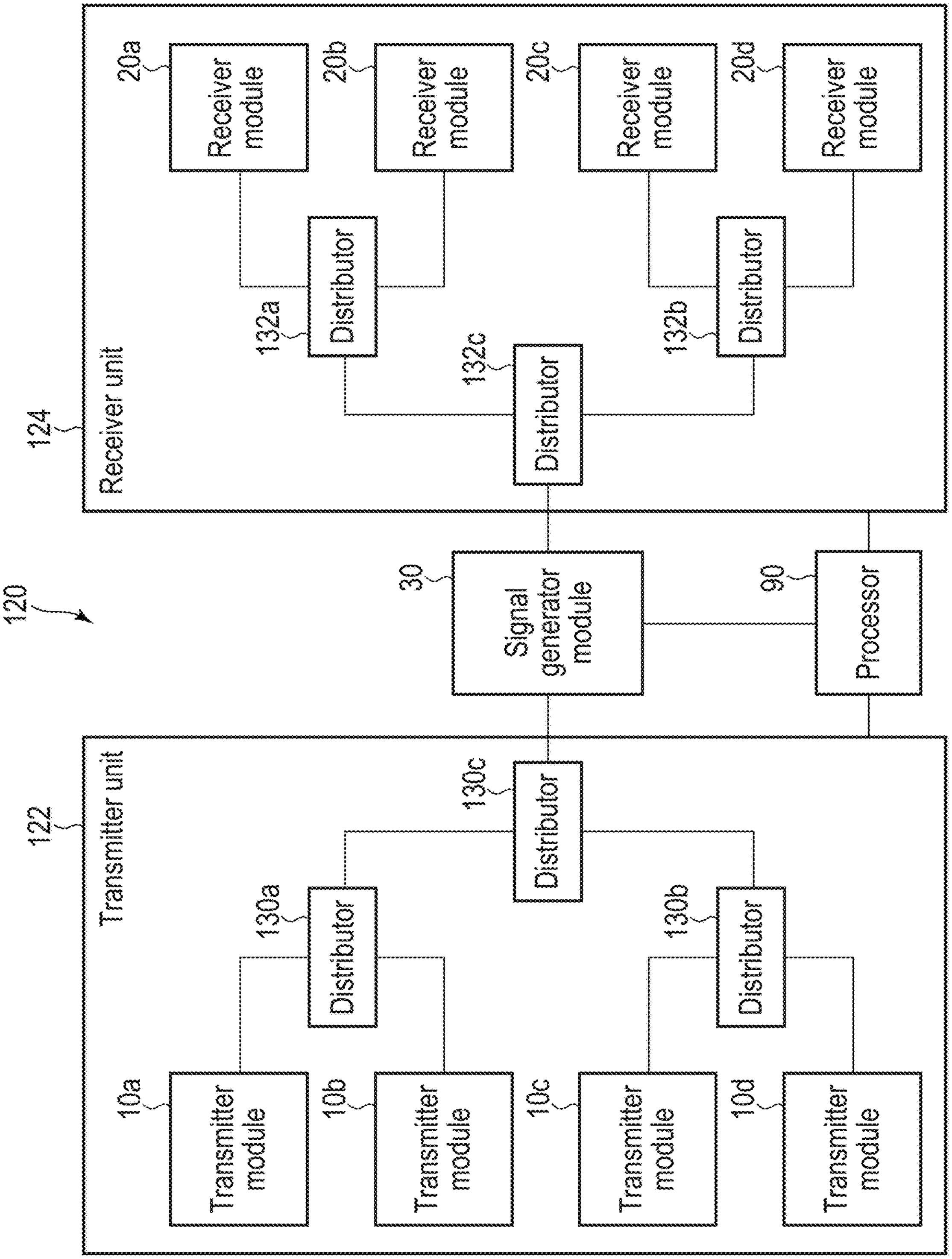
FIG. 3 is a block diagram illustrating another example of a radar device according to the embodiment.

FIG. 3 is a block diagram illustrating another example of a radar device 120 according to the embodiment. FIG. 3 includes a modified example of the antenna module. FIG. 1 shows an example in which the number of the antennas of the transmit/receive antenna array is sixteen. FIG. 3 shows an example in which the number of the antennas of the transmit/receive antenna array is sixty-four. The radar device 120 includes a transmitter unit 122, a receiver unit 124, the signal generator module 30, and the processor 90.

The signal generator module 30 is connected to the transmitter unit 122 and the receiver unit 124. Since the clock signal from the single signal generator module 30 is supplied to the transmitter unit 122 and the receiver unit 124, the transmission and the reception can be synchronized.

The transmitter unit 122 includes transmitter modules 10*a*, 10*b*, 10*c*, and 10*d* and distributors 130*a*, 130*b*, and 130*c*. Each of the transmitter modules 10*a*, 10*b*, 10*c*, and 10*d* is equivalent to the transmitter module 10 shown in FIG. 1. Each of the transmitter modules 10*a*, 10*b*, 10*c*, and 10*d* includes sixteen transmit antennas 16. The transmitter module 122 includes sixty-four transmit antennas 16. The number of the transmitter modules 10 included in the transmitter unit 122 is not limited to four, but may be any number as long as the number is two or more.

The distributor 130*c* supplies the signals (chirp signal and clock signal) from the signal generator module 30 to each of the distributor 130*a* and the distributor 130*b*. The distributor 130*a* supplies the signals from the distributor 130*c* to each of the transmitter module 10*a* and the transmitter module 10*b*. The distributor 130*b* supplies the signals from the distributor 130*c* to each of the transmitter module 10*c* and the transmitter module 10*d*.

The distributor 130*c* is arranged at a position substantially equidistant from the distributor 130*a* and the distributor 130*b*. The distributor 130*a* is arranged at a position substantially equidistant from the transmitter module 10*a* and the transmitter module 10*b*. The distributor 130*b* is arranged at a position substantially equidistant from the transmitter module 10*c* and the transmitter module 10*d*. Therefore, the chirp signal from the signal generator module 30 is supplied to each of the transmitter modules 10*a* to 10*d* via the signal lines having the substantially equal lengths. The operations of the receiver modules 10*a* to 10*d* are synchronized based on the clock signal from the signal generator module 30.

The receiver unit 124 includes receiver modules 20*a*, 20*b*, 20*c*, and 20*d* and distributors 132*a*, 132*b*, and 132*c*. Each of the receiver modules 20*a*, 20*b*, 20*c*, and 20*d* is equivalent to the receiver module 20 shown in FIG. 1. Each of the receiver modules 20*a*, 20*b*, 20*c*, and 20*d* includes sixteen receive antennas. The receiver unit 124 includes sixty-four receive antennas 26. The number of the receiver modules 20 included in the receiver unit 124 is not limited to four, but may be any number as long as the number is two or more.

The distributor 132*c* supplies the signals (chirp signal and clock signal) from the signal generator module 30 to each of the distributor 132*a* and the distributor 132*b*. The distributor 132*a* supplies the signals from the distributor 132*c* to each of the receiver module 20*a* and the receiver module 20*b*. The distributor 132*b* supplies the signals from the distributor 132*c* to each of the receiver module 20*c* and the receiver module 20*d*. The distributor 132*c* is arranged at a position substantially equidistant from the distributor 132*a* and the distributor 132*b*. The distributor 132*a* is arranged at a position substantially equidistant from the receiver module 20*a* and the receiver module 20*b*. The distributor 132*b* is arranged at a position substantially equidistant from the receiver module 20*c* and the receiver module 20*d*. Therefore, the chirp signal and the clock signal from the signal generator module 30 are supplied to each of the receiver modules 20*a* to 20*d* via the signal lines having the substantially equal lengths. The operations of the receiver modules 20*a* to 20*d* are synchronized based on the clock signal from the signal generator module 30.

The transmitter modules 10*a*, 10*b*, 10*c*, and 10*d*, the receiver modules 20*a*, 20*b*, 20*c*, and 20*d*, and the signal generator module 30 are connected to the processor 90.

The radar device 120 of FIG. 3 uses sixteen ICs 12 to operate the sixty-four transmit antennas 16 and uses sixteen ICs 22 to operate the sixty-four receive antennas 26. Therefore, the spatial resolution of the radar device 120 can be quadruple of the spatial resolution of the radar device 110 in which the four ICs 12 are used to operate the sixteen transmit antenna 16 and the four ICs 22 are used to operate the sixteen receive antennas 26.

One application example of the radar devices 110 and 120 according to the embodiment is a security system for inspecting belongings of an object. For example, locations where this system is arranged are near entrance gates of areas where security is required to be maintained, such as train stations, amusement parks, concert halls, and buildings. This system inspects the object when the object passes through the entrance gate and prevents an object possessing a predetermined item from entering the area. It is not desirable to stop the object for the inspection. Therefore, a walk-through type inspection device that emits electromagnetic waves to the object passing through the gate is proposed.

Figure 4:
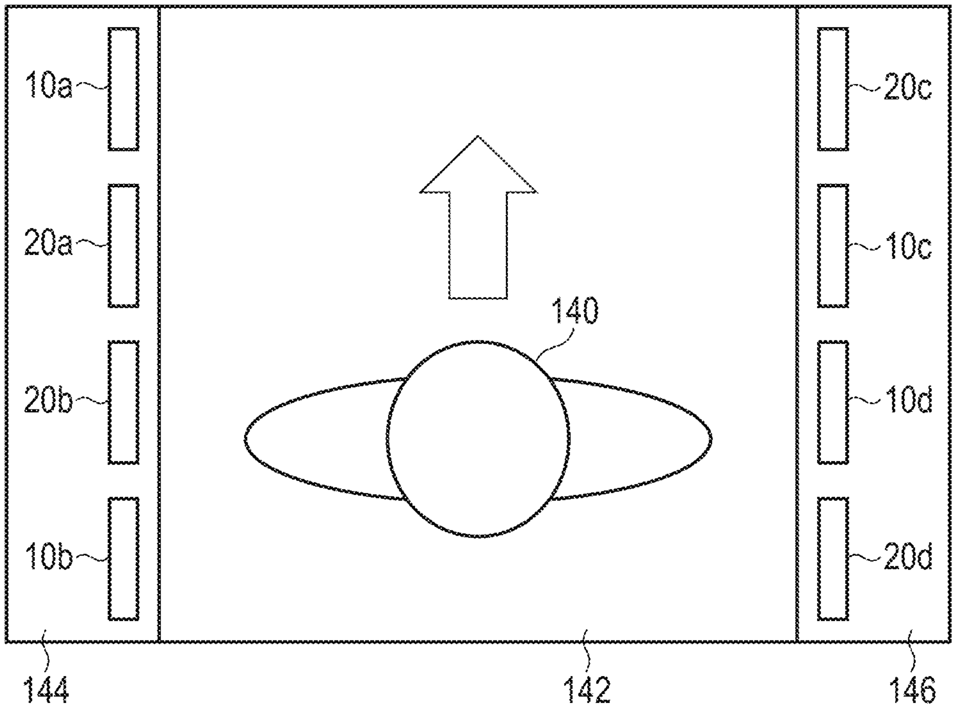
FIG. 4 illustrates the principle of a walk-through type inspection device, which is one application example of the radar device according to the embodiment.

FIG. 4 illustrates the principle of the walk-through type inspection device, which is one application example of the radar device according to the embodiment. FIG. 4 shows an example of the walk-through type inspection device to which the radar device 120 shown in FIG. 3 is applied. The radar device 110 shown in FIG. 1 can also be applied to the walk-through type inspection device.

The inspection device inspects the belongings of an object 140 walking through a path 142. The path 142 is also referred to as an inspection lane. A left enclosure 144 is arranged at the left portion of the path 142. A right enclosure 146 is arranged at the right portion of the path 142. In this specification, right and left refer to right and left viewed from the object 140 walking through the path 142. The left enclosure 144 and the right enclosure 146 are formed of a material that does not absorb and reflect electromagnetic waves, for example, resin.

The transmitter unit 122 shown in FIG. 3 is divided into two portions. A first portion includes the transmitter modules 10*a* and 10*b*. A second portion includes the transmitter modules 10*c* and 10*d*. The transmitter modules 10 may not be divided equally in number. For example, the transmitter unit 122 may be divided into three transmitter modules and one transmitter module. The transmitter modules 10*a* and 10*b* of the first portion are arranged in the left enclosure 144. The transmitter modules 10*c* and 10*d* of the second portion are arranged in the right enclosure 146.

The receiver unit 124 shown in FIG. 3 is divided into two portions. A first portion includes the receiver modules 20*a* and 20*b*. A second portion includes the receiver modules 20*c* and 20*d*. The receiver modules 20 may not be divided equally in number. For example, the receiver unit 124 may be divided into three receiver modules and one receiver module. The receiver modules 20*a* and 20*b* of the first portion are arranged in the left enclosure 144. The receiver modules 20*c* and 20*d* of the second portion are arranged in the right enclosure 146.

FIG. 4 does not specifically show the installation location and direction of the transmitter modules 10 and the receiver modules 20 in the left enclosure 144 and the right enclosure 146. The installation location and direction of the transmitter modules 10 and the receiver modules 20 in the left enclosure 144 and the right enclosure 146 may be arbitrary and can be determined according to specifications of the spatial resolution, the performance, and the like desired to be achieved.

Figure 5:
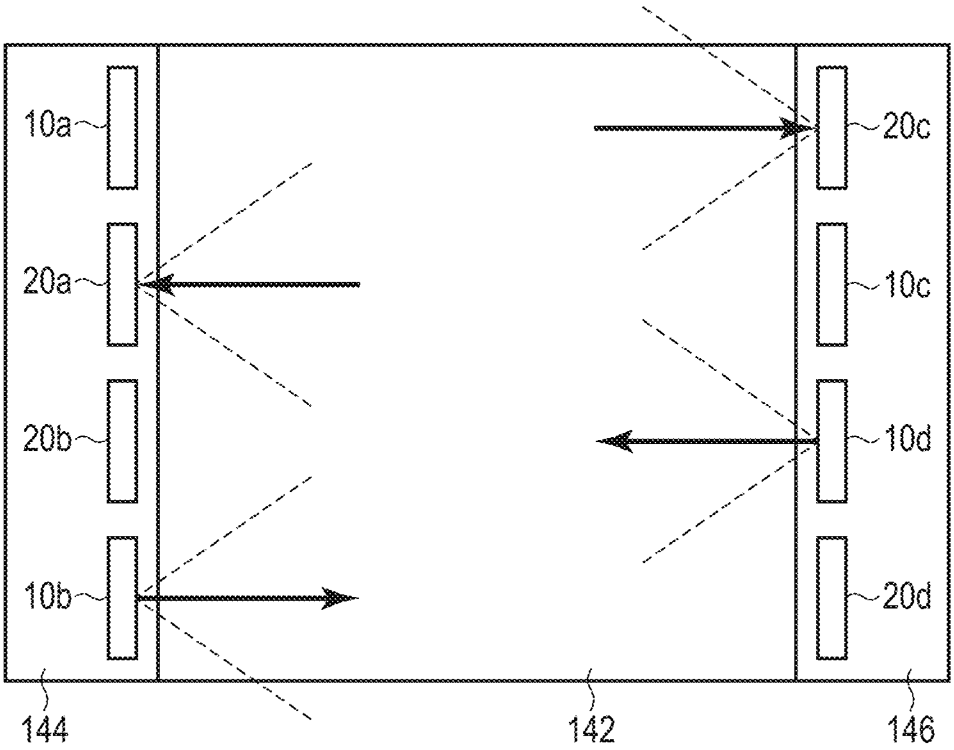
FIG. 5 illustrates the transmission directions of the electromagnetic waves of transmitter modules and the reception directions of the electromagnetic waves of receiver modules according to the embodiment.

FIG. 5 illustrates the transmission directions of the electromagnetic waves of the transmitter modules 10 (transmit antennas 16) and the reception directions of the electromagnetic waves of the receiver modules 20 (receive antennas 26) according to the embodiment. The direction of the electromagnetic wave is represented by the direction of a main lobe in the radiation pattern of the antenna.

The transmission directions of the electromagnetic waves of the transmitter modules 10 (transmit antennas 16) in the left enclosure 144 are to the right direction, such that the path 142 is the object inspection area. The reception directions of the electromagnetic waves of the receiver modules 20 (receive antennas 26) in the left enclosure 144 are to the right direction, such that the path 142 is the object inspection area.

The transmission directions of the electromagnetic waves of the transmitter modules 10 (transmit antennas 16) in the right enclosure 146 are to the left direction, such that the path 142 is the object inspection area. The reception directions of the electromagnetic waves of the receiver modules 20 (receive antennas 26) in the right enclosure 146 are to the left direction, such that the path 142 is the object inspection area.

Each of the right direction and the left direction is not limited to one angle, but is set to a range of angles. For example, when the entire circumference is 360 degrees and 0 degrees is the travel direction of the object 140, the right is +90 degrees and the left is +270 (−90) degrees. The right direction is an angle range of +90 degrees±less than 90 degrees. The left direction is an angle range of +270 degrees±less than 90 degrees.

Figure 6:
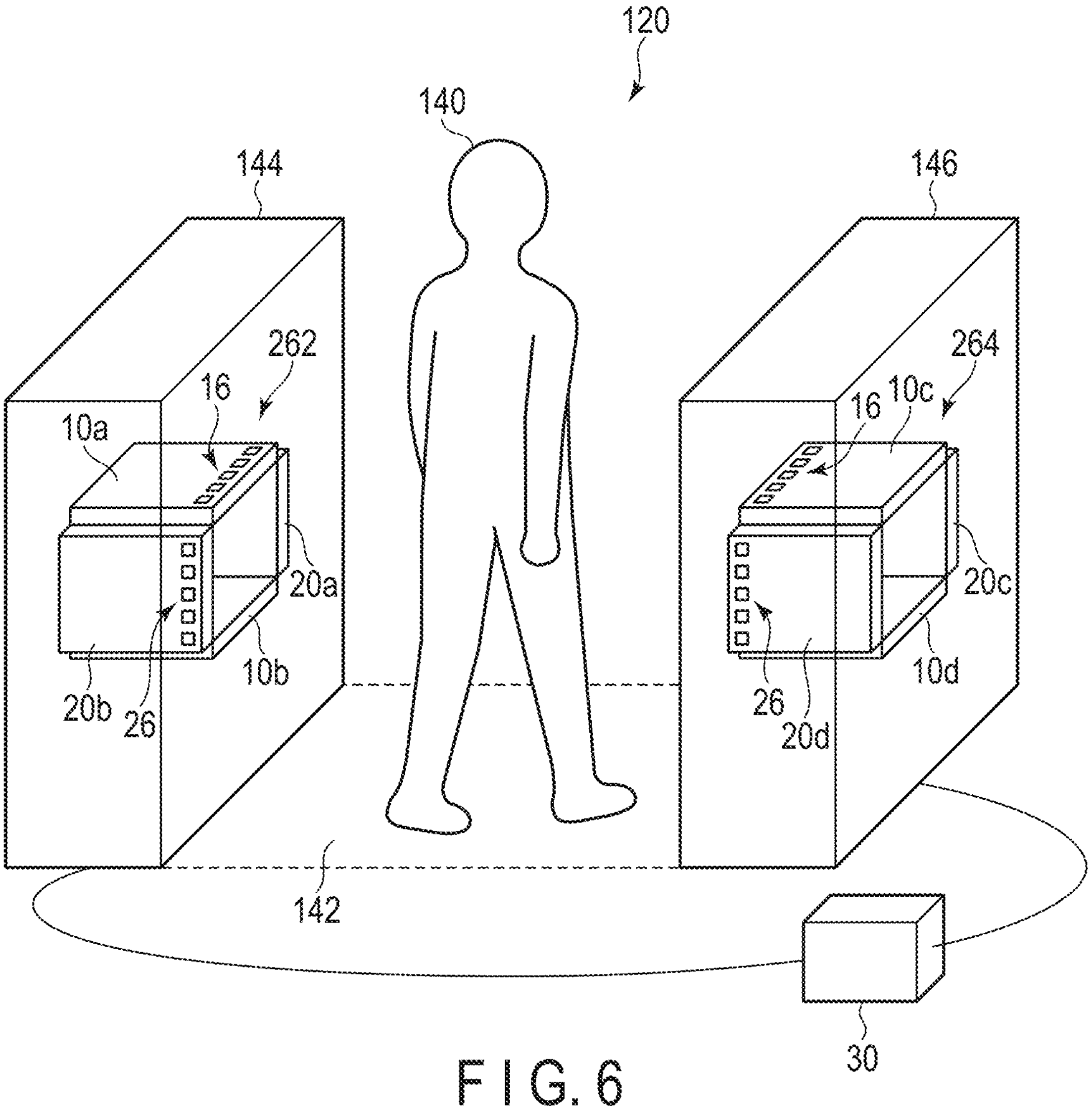
FIG. 6 is a perspective view illustrating an example of the walk-through type inspection device according to the embodiment.

FIG. 6 is a perspective view illustrating an example of the walk-through type inspection device which is the application example of the radar device 120 according to the embodiment.

In the left enclosure 144, the substrate of the transmitter module 10*a* and the substrate of the transmitter module 10*b* are arranged so as to be parallel to, in other words, horizontal to the surface of the path 142. The substrate of the receiver module 20*a* and the substrate of the receiver module 20*b* are arranged so as to be orthogonal to, in other words, vertical to the surface of the path 142. The transmitter modules 10*a* and 10*b*, and the receiver modules 20*a* and 20*b* are arranged to form a cuboid antenna module 262.

In the transmitter modules 10*a* and 10*b*, sixteen transmit antennas 16 are arranged in a line at one end of each of the transmitter modules 10*a* and 10*b* (substrates). In the transmitter modules 20*a* and 20*b*, sixteen transmit antennas 26 are arranged in a line at one end of each of the transmitter modules 20*a* and 20*b* (substrates).

The transmitter modules 10*a* and 10*b* in the left enclosure 144 are arranged in a direction in which the transmit antennas 16 are opposed to the path 142. The receiver modules 20*a* and 20*b* in the left enclosure 144 are arranged in a direction in which the receive antennas 26 are opposed to the path 142.

The above arrangement of the transmitter modules 10*a* and 10*b* and the arrangement of the receiver modules 20*a* and 20*b* are examples. These modules may be arranged in arrangements other than the above, for example, may be arranged linearly in one or two lines, or be arranged simply in four lines. The transmit antennas 16 and the receive antennas 26 in the antenna module 262 may also be arranged in arrangements other than the above, for example, may be arranged linearly in one or two lines, or be arranged simply in four lines. Furthermore, a plurality of antenna modules 262 may be arranged in the enclosure 144.

The distributors 130 and 132 (not shown in FIG. 6) are also arranged in the left enclosure 144.

In the right enclosure 146, the substrate of the transmitter module 10*c* and the substrate of the transmitter module 10*d* are arranged so as to be parallel to, in other words, horizontal to the surface of the path 142. The substrate of the receiver module 20*c* and the substrate of the receiver module 20*d* are arranged so as to be orthogonal to, in other words, vertical to the surface of the path 142. The transmitter modules 10*c* and 10*d* and the receiver module 20*c* and 20*d* are arranged to form a cuboid antenna module 264.

In the transmitter modules 10*c* and 10*d*, sixteen transmit antennas 16 are arranged in a line at one end of each of the transmitter modules 10*c* and 10*d* (substrate). In the transmitter modules 20*c* and 20*d*, sixteen transmit antennas 26 are arranged in a line at one end of each of the transmitter modules 20*c* and 20*d* (substrate).

The transmitter modules 10*c* and 10*d* in the right enclosure 146 are arranged in a direction in which the transmit antennas 16 are opposed to the path 142. The transmitter modules 20*c* and 20*d* in the right enclosure 146 are arranged in a direction in which the transmit antennas 26 are opposed to the path 142.

The above arrangement of the transmitter modules 10*c* and 10*d* and the arrangement of the receiver modules 20*c* and 20*d* are examples. These modules may be arranged in arrangements other than the above, for example, may be arranged linearly in one or two lines, or be arranged simply in four lines. The transmit antennas 16 and the receive antennas 26 in the antenna module 264 may also be arranged in arrangements other than the above, for example, may be arranged linearly in one or two lines, or be arranged simply in four lines. Furthermore, a plurality of antenna modules 264 may be arranged in the enclosure 146.

The distributors 130 and 132 are arranged in the right enclosure 146.

The signal generator module 30 is connected to the distributors 130*c* and 132*c*. The clock signal output from the signal generator module 30 is supplied to the transmitter module 122 and the receiver unit 124. Therefore, the ICs 12 and 22 operate in synchronization with each other.

The transmission antenna 16 can transmit the electromagnetic wave parallel to the substrate. The radar signal transmitted from one transmit antenna 16 in the transmitter modules 10*a* and 10*b* in the left enclosure 144 propagates toward the path 142 and is reflected in a left area of the object 140 on the path 142. A reflected wave of the radar signal (hereinafter referred to as a reflected signal) propagates toward the left enclosure 144. The receive antenna 26 can receive the electromagnetic wave parallel to the substrate. The reflected signal is received by all of the receive antennas 26 of the receiver modules 20*a* and 20*b* in the left enclosure 144. The receiver modules 20*a* and 20*b* process the received signals and supply the processed received signals to the processor 90. The processor 90 inspects the belongings in the left area of the object 140 based on the received signals. The processor 90 may generate an image of the object 140 based on the received signals and inspect the belongings based on the image.

The radar signal transmitted from one transmit antenna 16 in the transmitter modules 10*c* and 10*d* in the right enclosure 146 propagates toward the path 142 and is reflected in a right area of the object 140 on the path 142. The reflected signal propagates toward the right enclosure 146. The reflected signal is received by all of the receive antennas 26 of the receiver modules 20*c* and 20*d* in the right enclosure 146. The receiver modules 20*c* and 20*d* process the received signals and supply the processed received signals to the processor 90. The processor 90 inspects the belongings in the right area of the object 140 based on the received signals. The processor 90 may generate an image of the object 140 based on the received signals and inspect the belongings based on the image.

FIG. 6 shows an example in which the antennas 16 and 26 and the ICs 12 and 22 (including the distributors 130 and 132) are formed integrally on the substrate of the module.

The antennas 16 and 26 and the ICs 12 and 22 (including the distributors 130 and 132) may be formed on respective substrates.

An example of the transmit antenna 16 and the receive antenna 26 according to the embodiment includes a patch antenna, a dipole antenna including a reflection plate, or a substrate integrated waveguide (SIW) aperture antenna. When one of the transmit antenna array and the receive antenna array is arranged horizontally and the other of the transmit antenna array and the receive antenna array is arranged vertically, as shown in FIG. 6, one antenna array is either the dipole antenna including the reflection plate or the SIW aperture antenna and the other antenna array is the other of the SIW aperture antenna or the dipole antenna including the reflection plate.

Figure 7:
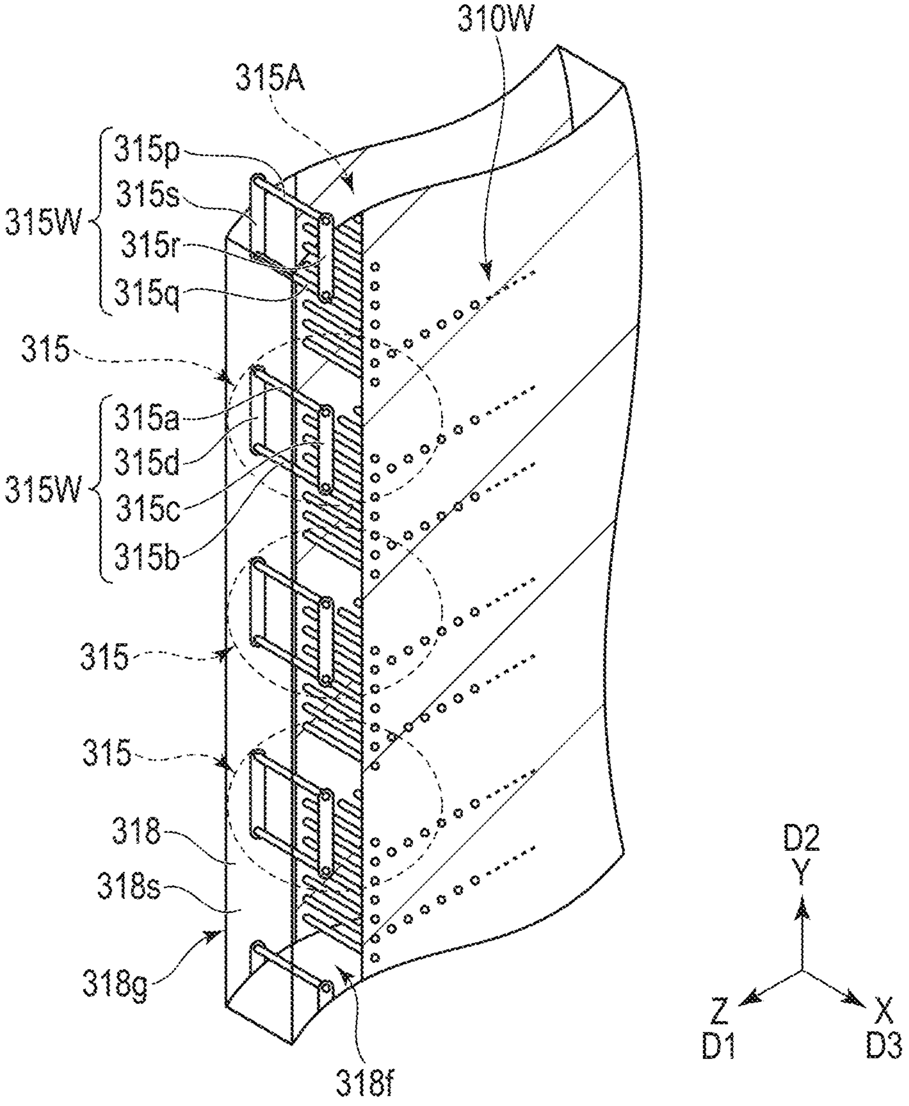
FIG. 7 is a schematic perspective view illustrating an example of a transmit antenna or a receive antenna including an SIW aperture antenna according to the embodiment.
Figure 8:
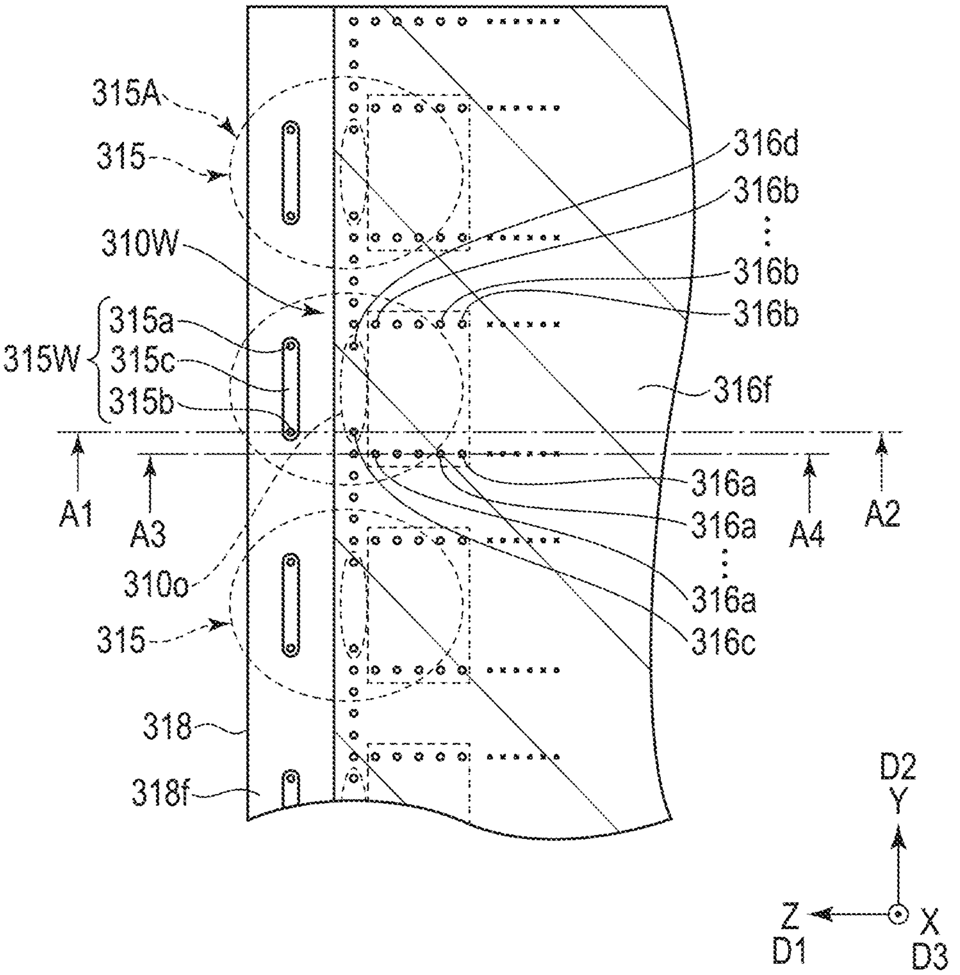
FIG. 8 is a schematic plan view illustrating an example of the transmit antenna or the receive antenna according to the embodiment.
Figure 9:
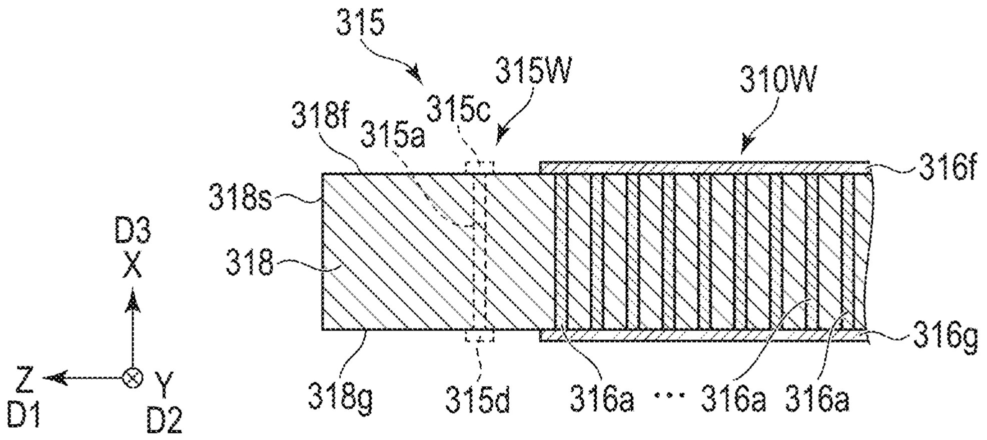
FIG. 9 is a schematic cross-sectional view illustrating the example of the transmit antenna or the receive antenna according to the embodiment.
Figure 10:
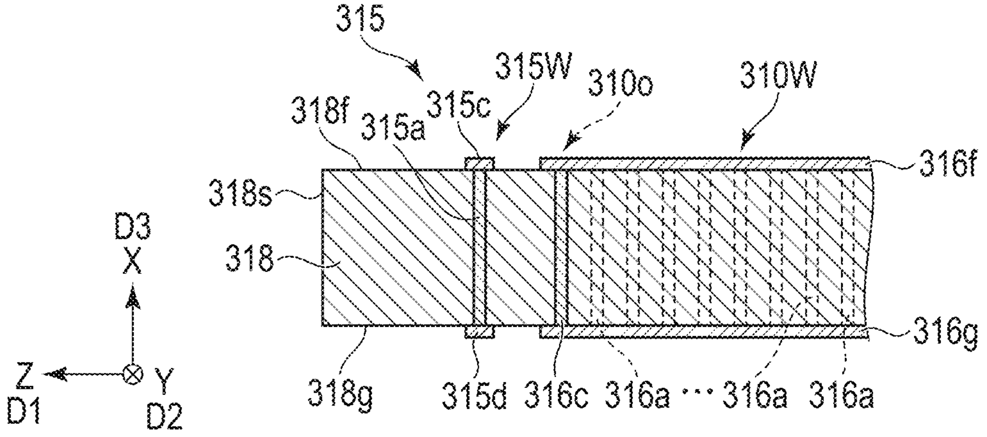
FIG. 10 is a schematic cross-sectional view illustrating the example of the transmit antenna or the receive antenna according to the embodiment.

FIG. 7 is a schematic perspective view illustrating an example of the transmit antenna 16 or the receive antenna 26 including the SIW aperture antenna according to the embodiment. FIG. 8 is a schematic plan view illustrating an example of the transmit antenna 16 or the receive antenna 26 according to the embodiment. FIG. 9 is a schematic cross-sectional view illustrating an example of the transmit antenna 16 or the receive antenna 26 according to the embodiment. FIG. 9 is a cross-sectional view along a line A1-A2 in FIG. 8. FIG. 10 is a schematic cross-sectional view illustrating an example of the transmit antenna 16 or the receive antenna 26 according to the embodiment. FIG. 10 is a cross-sectional view along a line A3-A4 in FIG. 8.

A substrate 318 includes a plurality of antennas 315. The antenna 315 includes a first structure 310W. The first structure 310W is the SIW. The antenna 315 is the SIW aperture antenna.

The first structure 310W includes a first waveguide conductive layer 316*f*, another first waveguide conductive layer 316*g*, a plurality of first waveguide electrode portions 316*a*, and a plurality of second waveguide electrode portions 316*b*. The direction from the other first waveguide conductive layer 316*g* to the first waveguide conductive layer 316*f* is along the third direction D3. As shown in FIG. 8, the direction from the waveguide conductive electrode portions 316*a* to the waveguide conductive electrode portions 316*b* is along the second direction D2.

The first waveguide conductive layer 316*f* and the other first waveguide conductive layer 316*g* are electrically connected to each other by the first waveguide conductive electrode portions 316*a* and the second waveguide conductive electrode portions 316*b*. The first direction D1, the second direction D2, and the third direction D3 are orthogonal to one another. The third direction D3 may be referred to as the X-axis direction. In that case, the second direction D2 is referred to as the Y-axis direction and the first direction D1 is referred to as the Z-axis direction.

The first structure 310W may further include a third waveguide electrode portion 316*c* and a fourth waveguide electrode portion 316*d*. The third waveguide electrode portion 316*c* is electrically connected to the first waveguide conductive layer 316*f* and the other first wave guide conductive layer 316*g*. The fourth waveguide conductive electrode portion 316*d* is electrically connected to the first waveguide conductive layer 316*f* and the other first waveguide conductive layer 316*g*. The distance along the second direction D2 between the third waveguide conductive electrode portion 316*c* and the fourth waveguide conductive electrode portion 316*d* is shorter than the distance along the second direction D2 between the first waveguide conductive electrode portions 316*a* and the second waveguide conductive electrode portions 316*b*. The first structure 310W may not include the third waveguide electrode portion 316*c* and the fourth waveguide electrode portion 316*d*.

A part of the substrate 318 is arranged between the first waveguide conductive layer 316*f* and the other first waveguide conductive layer 316*g* and between the first waveguide conductive electrode portions 316*a* and the second waveguide conductive electrode portions 316*b*.

The first structure 310W includes an aperture 310*o*. The aperture 310*o* is arranged at an end of the first structure 310W in the first direction D1. The aperture 310*o* functions as an aperture antenna. The electromagnetic wave is irradiated from the aperture 310*o*.

The antenna 315 may include waveguides 315W. The waveguide 315W includes a first conductive layer 315*c*, another first conductive layer 315*d*, a first electrode portion 315*a*, and another first electrode portion 315*b*. The direction from the other first conductive layer 315*d* to the first conductive layer 315*c* is along the third direction D3. The direction from the other first electrode portion 315*b* to the first electrode portion 315*a* is along the second direction D2. The first conductive layer 315*c* and the other first conductive layer 315*d* are electrically connected to each other by the first electrode portion 315*a* and the other first electrode portion 315*b*.

At least a part of the substrate 318 is arranged between the first conductive layer 315*c* and the other first conductive layer 315*d* and between the first electrode portion 315*a* and the other first electrode portion 315*b*.

The position of the third waveguide electrode portion 316*c* in the first direction D1 is between the position of the first conductive layer 315*c* in the first direction D1 and the position of the first waveguide electrode portions 316*a* in the first direction D1. The position of the fourth waveguide electrode portion 316*d* in the first direction D1 is between the position of the first conductive layer 315*c* in the first direction D1 and the position of the second waveguide electrode portions 316*b* in the first direction D1. The first waveguide electrode portions 316*a* and the second waveguide electrode portions 316*b* that form the aperture 310*o* may be opposed to one of the waveguides 315W. The third waveguide electrode portion 316*c* and the fourth waveguide electrode portion 316*d* that form the aperture 310*o* may be opposed to one of the waveguides 315W.

The direction from the first waveguide conductive layer 316*f* to the first waveguide conductive layer 315*c* is along the first direction D1. The direction from the other first waveguide conductive layer 316*g* to the other first conductive layer 315*d* is along the first direction D1. For example, the other first conductive layer 316*g* may be a fixed potential (for example, a ground potential).

The substrate 318 has a first surface 318*f* and another first surface 318*g*. The direction from the other first surface 318*g* to the first surface 318*f* is along the third direction D3. The first conductive layer 315*c* is arranged at the first surface 318*f*. The other first conductive layer 315*d* is arranged at the other first surface 318*g*. One of the waveguides 315W extending along the third direction D3 in the substrate 318 can be coupled with one of the first structures 310W.

Figure 11:
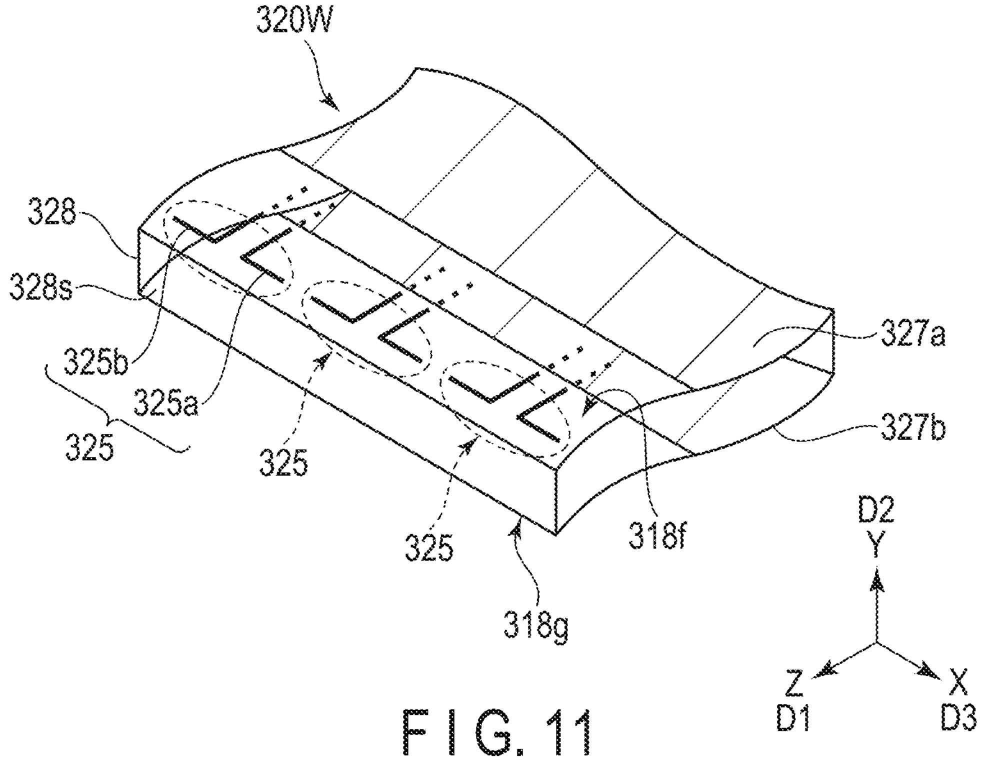
FIG. 11 is a schematic perspective diagram illustrating the example of the transmit antenna or the receive antenna according to the embodiment.
Figure 12:
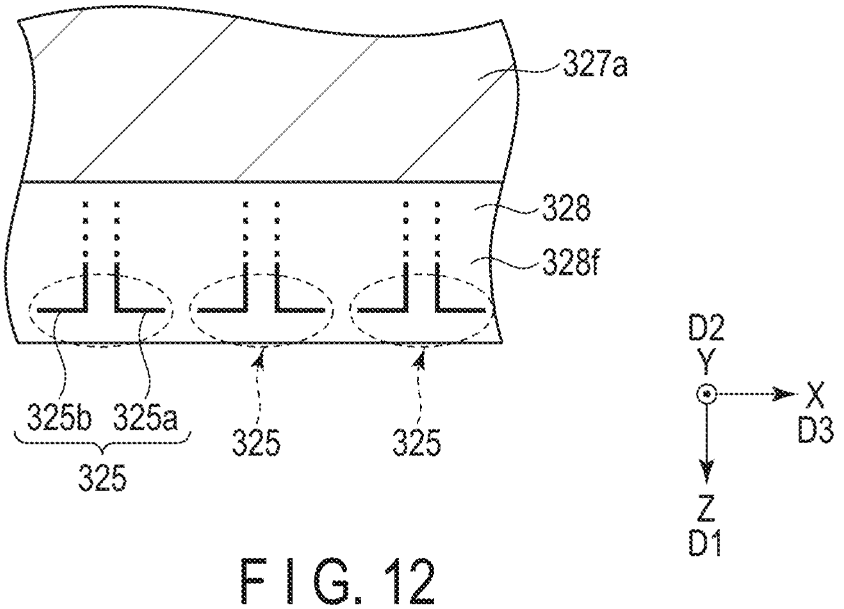
FIG. 12 is a schematic plan view illustrating the example of the transmit antenna or the receive antenna according to the embodiment.

FIG. 11 is a schematic perspective diagram illustrating an example of the receive antenna 26 or the transmit antenna 16 including the dipole antenna including the reflection plate according to the embodiment. FIG. 12 is a schematic plan view illustrating an example of the receive antenna 26 or the transmit antenna 16 according to the embodiment.

The substrate 328 includes a plurality of antennas 325. The antenna 325 includes a second conductive layer 325*a*. At least a part of the second conductive layer 325*a* extends along the third direction D3. The antenna 325 may include another second conductive layer 325*b*. At least a part of the other second conductive layer 325*b* extends along the third direction D3. The direction from the other second conductive layer 325*b* to the second conductive layer 325*a* is along the third direction D3. The second conductive layer 325*a* and the other second conductive layer 325*b* constitute the dipole antenna. The antenna 325 is the dipole antenna including the reflection plate.

The second conductive layer 325*a* and the other second conductive layer 325*b* are arranged at the second surface 328*f* of the substrate 328.

The substrate 328 may include a second waveguide conductive layer 327*a* and another second waveguide conductive layer 327*b*. The direction from the other second waveguide conductive layer 327*b* to the second waveguide conductive layer 327*a* is along the second direction D2. A part of the substrate 328 is arranged between the other second waveguide conductive layer 327*b* and the second waveguide conductive layer 327*a*. The second waveguide conductive layer 327*a* can be coupled with the second conductive layer 325*a* (and the other second conductive layer 325*b*). For example, the other second waveguide conductive layer 327*b* may be the fixed potential (for example, the ground potential). A plurality of second waveguide conductive layers 327*a* may be arranged. One of the second waveguide conductive layers 327*a* can be coupled with the second conductive layer 325*a* (and the other second conductive layer 325*b*).

The substrate 328 may include another second surface 328*g*. The direction from the other second surface 328*g* to the second surface 328*f* is along the second direction D2. The second waveguide conductive layer 327*a* may be arranged at the second surface 328*f*. The other second waveguide conductive layer 327*b* may be arranged at the other second surface 328*g*. The configurations of the transmit antenna 16 and the receive antenna 26 shown in FIG. 7 to FIG. 12 are examples, and the configurations are not limited to these examples.

Figure 13:
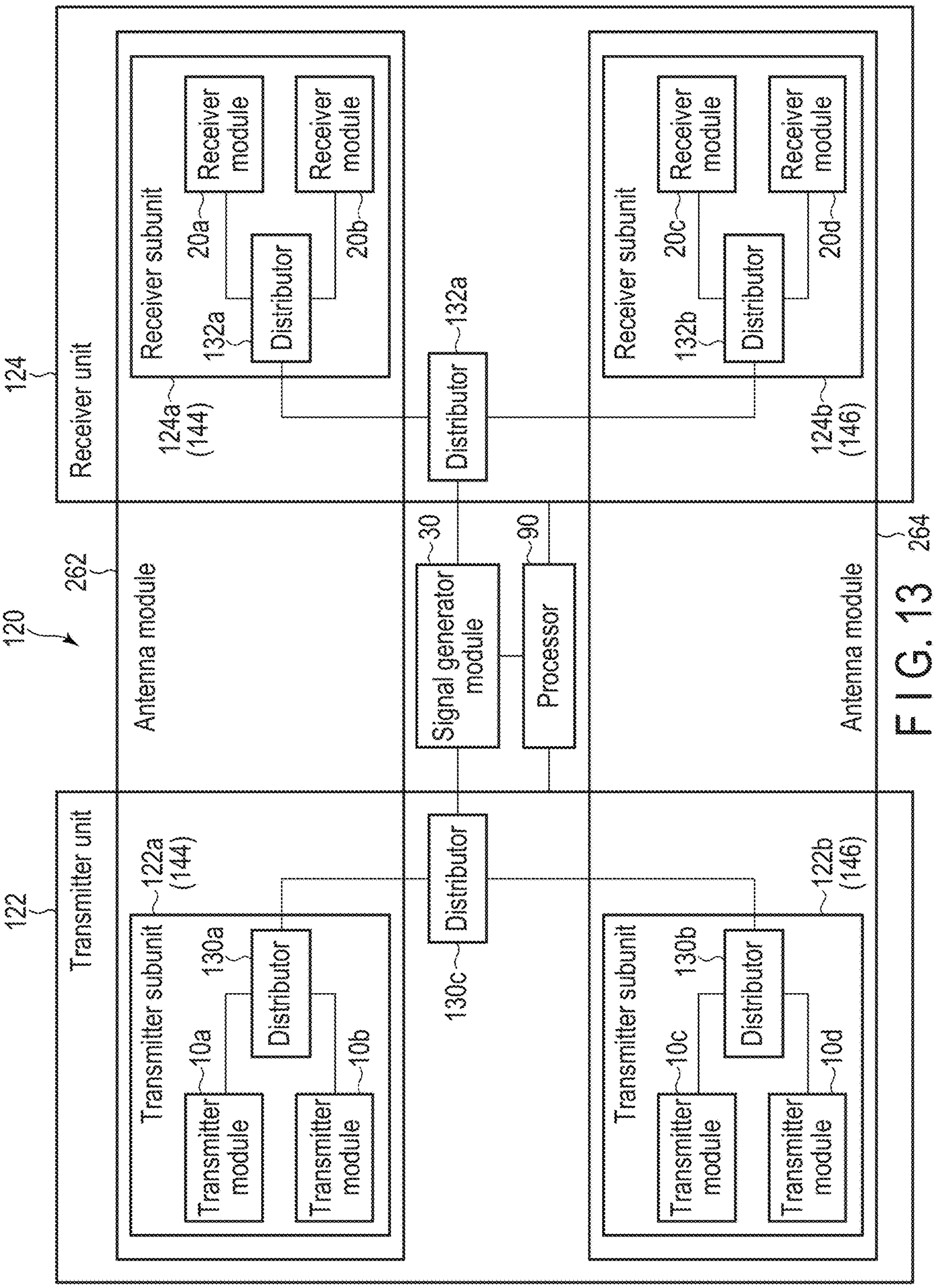
FIG. 13 is a block diagram illustrating an example of the electrical configuration of the radar device shown in FIG. 6.

FIG. 13 is a block diagram illustrating an example of the electrical configuration of the radar device 120 shown in FIG. 6. The radar device 120 includes the transmitter unit 122, the receiver unit 124, the signal generator module 30, and the processor 90. The transmitter unit 122 is divided into two transmitter subunits 122*a* and 122*b*. The receiver unit 124 is divided into two receiver subunits 124*a* and 124*b*.

The transmitter subunit 122*a* is arranged in the left enclosure 144. The transmitter subunit 122*a* includes the transmitter modules 10*a* and 10*b* and the distributor 130*a*. The transmitter subunit 122*b* is arranged in the right enclosure 146. The transmitter subunit 122*b* includes the transmitter modules 10*c* and 10*d* and the distributor 130*b*. The distributor 130*c* is not arranged in either the left enclosure 144 or the right enclosure 146, but is arranged in the vicinity of the signal generator module 30. A first output terminal of the distributor 130*c* is connected to the transmitter subunit 122*a* (distributor 130*a*). A second output terminal of the distributor 130*c* is connected to the transmitter subunit 122*b* (distributor 130*b*).

The receiver subunit 124*a* is arranged in the left enclosure 144. The receiver subunit 124*a* includes the receiver modules 20*a* and 20*b* and the distributor 132*a*. The receiver subunit 124*b* is arranged in the right enclosure 146. The receiver subunit 124*b* includes the receiver modules 20*c* and 20*d* and the distributor 132*b*. The distributor 132*c* is not arranged in either the left enclosure 144 or the right enclosure 146, but is arranged in the vicinity of the signal generator module 30. A first output terminal of the distributor 132*c* is connected to the receiver subunit 124*a* (distributor 132*a*) and a second output terminal of the distributor 132*c* is connected to the receiver subunit 124*b* (distributor 132*b*).

The antenna module 262 arranged in the left enclosure 144 includes the transmitter subunit 122*a* and the receiver subunit 124*a*. The antenna module 264 arranged in the right enclosure 146 includes the transmitter subunit 122*b* and the receiver subunit 124*b*.

The radar devices 110 and 120 according to the embodiment can inspect the belongings of the object 140 walking through the path 142. Since the object 140 does not need to stop for the inspection, the inspection throughput of the radars 110 and 120 is improved.

In order to further improve the inspection throughput, it is proposed to provide a plurality of radar devices to simultaneously inspect a plurality of objects on a plurality of inspection lanes. In this case, the number of the radar devices to be arranged increases in accordance with the number of the inspection lanes, increasing the cost. In addition, the entire inspection lanes expand due to the size of the enclosure of the radar device and the margin area between the radar devices (between the inspection lanes) for installation and maintenance purposes. Furthermore, since the operations between the radar devices adjacent to each other are in asynchronous, interference may occur at unexpected timings between the radar devices, affecting the inspection results. The interference can be avoided by introducing the electromagnetic wave absorption material or the electromagnetic wave reflection control material between the radar devices, but the introduction of these materials leads to increases in cost and margin space.

Figure 14:
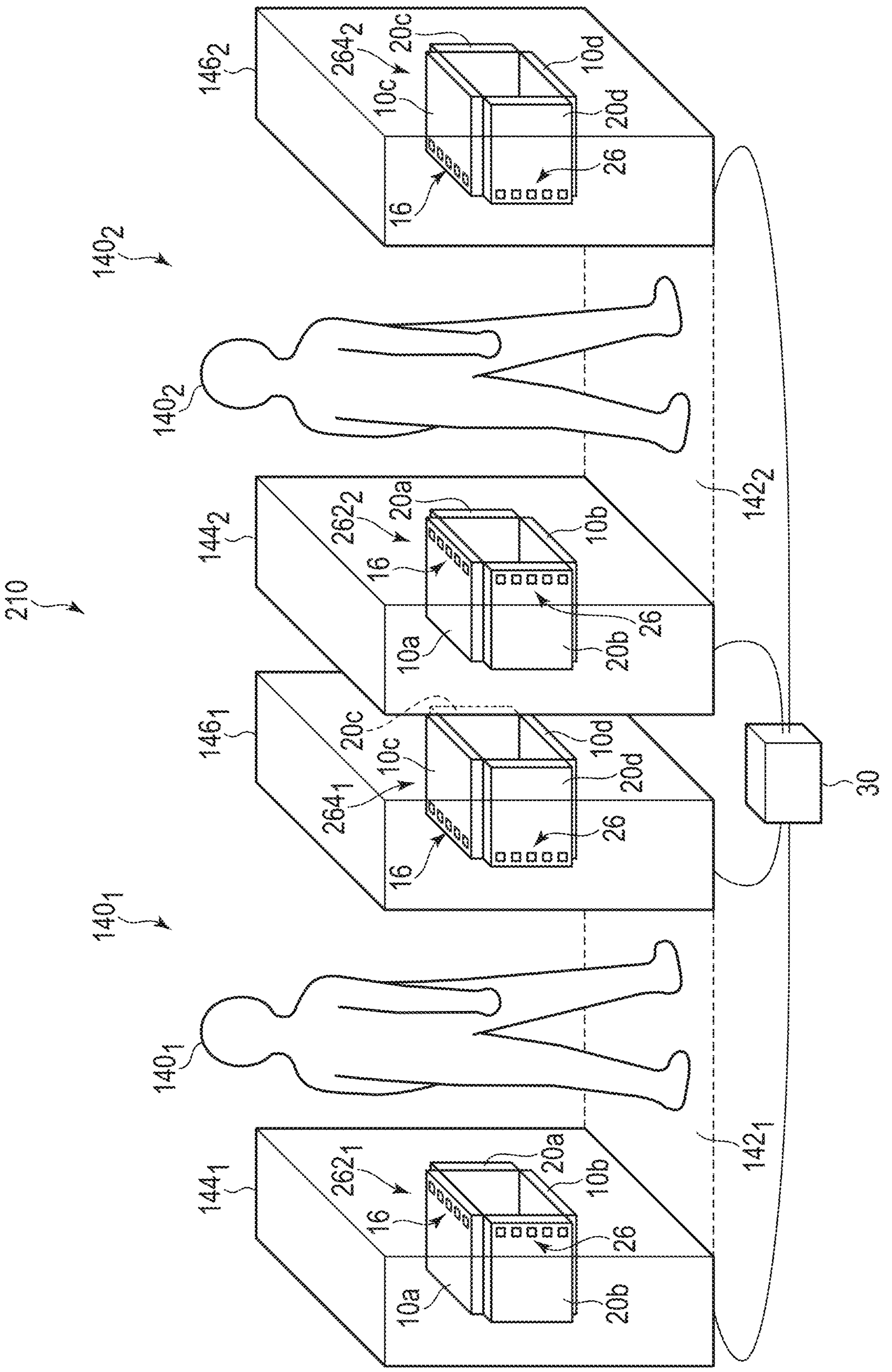
FIG. 14 is a perspective view illustrating another example of the walk-through type inspection device according to the embodiment.

FIG. 14 is a perspective view illustrating an example of a walk-through type inspection device 210, which is an application example of the radar device according to the embodiment. The inspection device 210 includes a plurality of radar devices 120 (FIG. 6) arranged along a plurality of paths. The inspection device 210 may include a plurality of radar devices 100 (FIG. 1) arranged along a plurality of paths, instead of the radar devices 120. For the sake of illustration, FIG. 14 shows the inspection device 210 including two lanes, but the inspection device 210 including three or more lanes is configured in the same manner. A first path 142$_1$ and a second path 142$_2$ are defined. The second path 142$_2$ is arranged at the right of the first path 142$_1$.

The first left enclosure 144$_1$ is arranged at the left portion of the first path 142$_1$. The first right enclosure 146$_1$ is arranged at the right portion of the first path 142$_1$. The second left enclosure 144$_2$ is arranged at the left portion of the second path 142$_2$. The second right enclosure 146$_2$ is arranged at the right portion of the second path 142$_2$. The first right enclosure 146$_1$ and the second left enclosure 144$_2$ do not need to be spaced apart, but may be in close contact with each other. In other words, the first right enclosure 146$_1$ and the second left enclosure 144$_2$ may be a single enclosure.

The configurations of the first left enclosure 144$_1$ and the second left enclosure 144$_2$ are the same as that of the left enclosure 144 shown in FIG. 6. The configurations of the first right enclosure 146$_1$ and the second right enclosure 146$_2$ are the same as that of the right enclosure 146 shown in FIG. 6.

The signal generator module 30 is connected to the first left enclosure 144$_1$, the first right enclosure 146$_1$, the second left enclosure 144$_2$, and the second right enclosure 146$_2$.

Figure 15:
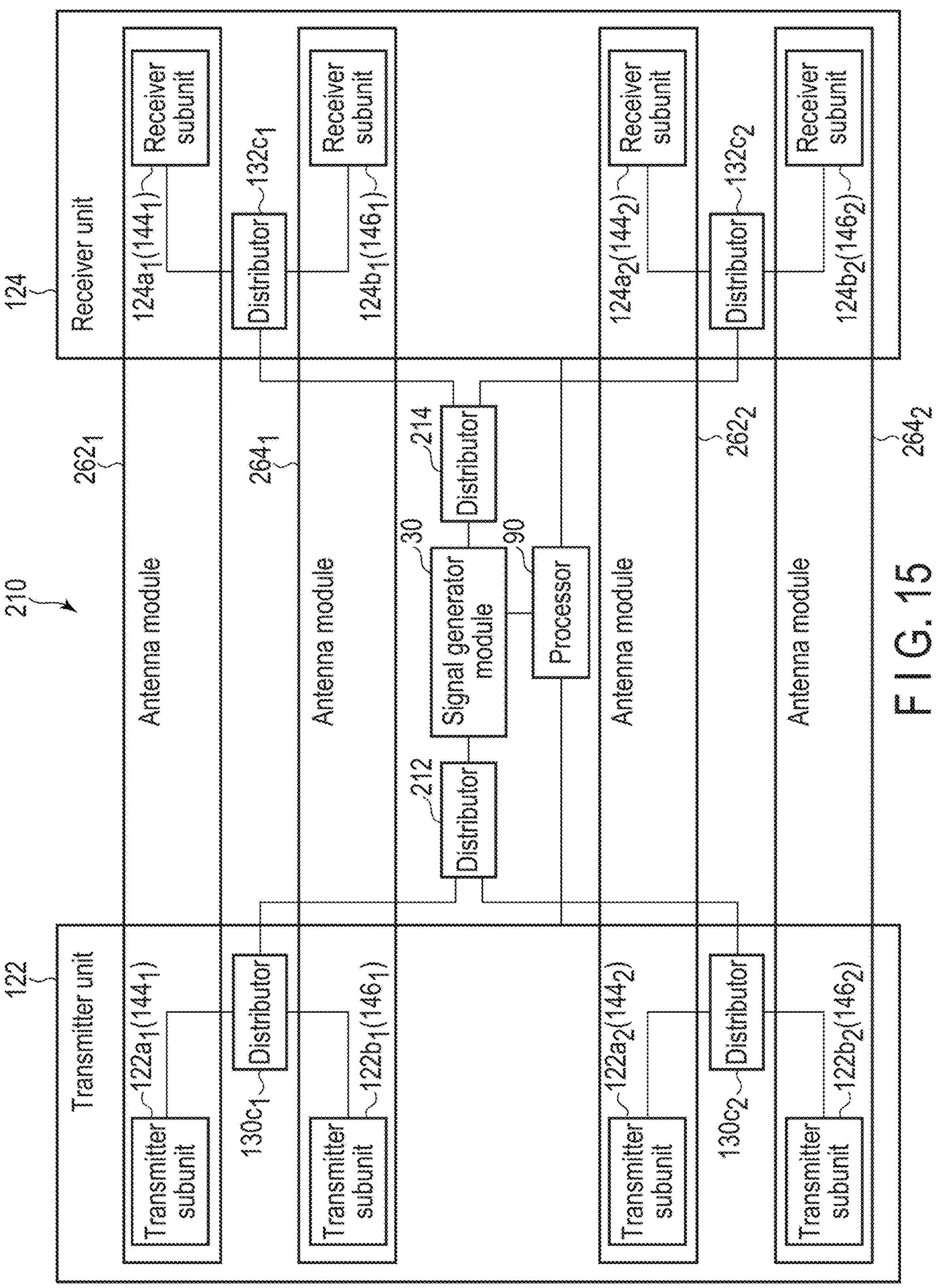
FIG. 15 is a block diagram illustrating an example of the electrical configuration of the inspection device according to the embodiment.

FIG. 15 is a block diagram illustrating an example of the electrical configuration of the inspection device 210 according to the embodiment. The inspection device 210 includes the transmitter unit 122, the receiver unit 124, the signal generator module 30, and the processor 90.

The transmitter unit 122 includes four transmitter subunit $\mathbf{122}a_1$, $\mathbf{122}b_1$, $\mathbf{122}a_2$, and $\mathbf{122}b_2$. The configurations of the transmitter subunits $\mathbf{122}a_1$ and $\mathbf{122}a_2$ are the same as that of the transmitter subunit 122*a* in the left enclosure 144 shown in FIG. 13. The configurations of the transmitter subunits $\mathbf{122}b_1$ and $\mathbf{122}b_2$ are the same as that of the transmitter subunit 122*b* in the right enclosure 146 shown in FIG. 13. The transmitter unit 122 further includes distributors $\mathbf{130}c_1$ and $\mathbf{130}c_2$.

The receiver unit 124 includes four receiver subunits $\mathbf{124}a_1$, $\mathbf{124}b_1$, $\mathbf{124}a_2$, and $\mathbf{124}b_2$. The configurations of the receiver subunits $\mathbf{124}a_1$ and $\mathbf{124}a_2$ are the same as that of the receiver subunit 124*a* in the left enclosure 144 shown in FIG. 13. The configurations of the receiver subunits $\mathbf{124}b_1$ and $\mathbf{124}b_2$ are the same as that of the receiver subunit 124*b* in the right enclosure 146 shown in FIG. 13. The receiver unit 124 further includes distributors $\mathbf{132}c_1$ and $\mathbf{132}c_2$.

A first output signal of the signal generator module 30 is supplied to a distributor 212. A second output signal of the signal generator module 30 is supplied to a distributor 214. The two output signals of the distributor 212 are supplied to the distributors $\mathbf{130}c_1$ and $\mathbf{130}c_2$, respectively. The two output signals of the distributor 214 are supplied to the distributors $\mathbf{132}c_1$ and $\mathbf{132}c_2$, respectively. The distributors $\mathbf{130}c_1$ and $\mathbf{130}c_2$ are not arranged in the inside of any of the first left enclosure $\mathbf{144}_1$, the first right enclosure $\mathbf{146}_1$, the second left enclosure $\mathbf{144}_2$, or the second right enclosure $\mathbf{146}_2$, but are arranged in the vicinity of the distributor 212. The distributors $\mathbf{132}c_1$ and $\mathbf{132}c_2$ are not arranged in the inside of any of the first left enclosure $\mathbf{144}_1$, the first right enclosure $\mathbf{146}_1$, the second left enclosure $\mathbf{144}_2$, or the second right enclosure $\mathbf{146}_2$, but are arranged in the vicinity of the distributor 214.

The transmitter subunit $\mathbf{122}a_1$ and the receiver subunit $\mathbf{124}a_1$ are arranged in the left enclosure $\mathbf{144}_1$ of the first path $\mathbf{142}_1$. The transmitter subunit $\mathbf{122}b_1$ and the receiver subunit $\mathbf{124}b_1$ are arranged in the right enclosure $\mathbf{146}_1$ of the first path $\mathbf{142}_1$. The transmitter subunit $\mathbf{122}a_2$ and the receiver subunit $\mathbf{124}a_2$ are arranged in the left enclosure $\mathbf{144}_2$ of the second path $\mathbf{142}_2$. The transmitter subunit $\mathbf{122}b_2$ and the receiver subunit $\mathbf{124}b_2$ are arranged in the right enclosure $\mathbf{146}_2$ of the second path $\mathbf{142}_2$.

An antenna module $\mathbf{262}_1$ arranged in the first left enclosure $\mathbf{144}_1$ includes the transmitter subunit $\mathbf{122}a_1$ and the receiver subunit $\mathbf{124}a_1$. An antenna module $\mathbf{264}_1$ arranged in the first right enclosure $\mathbf{146}_1$ includes the transmitter subunit $\mathbf{122}b_1$ and the receiver subunit $\mathbf{124}b_1$. An antenna module $\mathbf{262}_2$ arranged in the second left enclosure $\mathbf{144}_2$ includes the transmitter subunit $\mathbf{122}a_2$ and the receiver subunit $\mathbf{124}a_2$. An antenna module $\mathbf{264}_2$ arranged in the second right enclosure $\mathbf{146}_2$ includes the transmitter subunit $\mathbf{122}b_2$ and the receiver subunit $\mathbf{124}b_2$.

In the antenna modules $\mathbf{262}_1$, $\mathbf{264}_1$, $\mathbf{262}_2$, and $\mathbf{264}_2$, all of the transmitter modules 10 and the receiver modules 20 are controlled by the chirp signal and the clock signal supplied from the signal generator module 30 and the trigger signal supplied from the processor 90. Thus, since the signal generator module 30 is used in common for a plurality of inspection lanes, the cost can be reduced, and since the inspection lanes are in synchronization, the effects of unexpected interference can be suppressed.

In order to avoid mutual interference due to the transmit antennas 16 transmitting the radar signals at the same timing, the processor 90 selectively supplies the trigger signal to parts of the transmitter modules 10 such that the transmit antennas 16 are separately driven for a certain part. An example of the parts includes time, frequency, and codes.

FIG. 16 is a diagram illustrating an example of transmission/reception sequence of the inspection device 210 according to the embodiment. FIG. 16 shows an example of time division transmission of the radar signal. The processor 90 supplies the trigger signal to the transmitter module such that the antenna module $\mathbf{262}_1$ arranged in the first left enclosure $\mathbf{144}_1$ and the antenna module $\mathbf{264}_1$ arranged in the first right enclosure $\mathbf{146}_1$ are sequentially driven for the inspection of the second path $\mathbf{142}_1$. Next, the processor 90 supplies the trigger signal to the transmitter module such that the antenna module $\mathbf{262}_2$ arranged in the second left enclosure $\mathbf{144}_2$ and the antenna module $\mathbf{264}_2$ arranged in the second right enclosure $\mathbf{146}_2$ are sequentially driven for the inspection of the second path $\mathbf{142}_2$.

More specifically, for the inspection of the first path $\mathbf{142}_1$, the processor 90 supplies the trigger signal to the antenna module 10*a* in the antenna module $\mathbf{262}_1$ arranged in the first left enclosure $\mathbf{144}_1$. The transmitter module 10*a* causes the transmit antennas 16*a*, 16*b*, to sequentially transmit the radar signals toward the first path $\mathbf{142}_1$. Next, the processor 90 supplies the trigger signal to the transmitter module 10*b* in the antenna module $\mathbf{262}_1$. The transmitter module 10*b* causes the transmit antennas 16*a*, to sequentially transmit the radar signals toward the first path $\mathbf{142}_1$. Next, the processor 90 supplies the trigger signal to the transmitter module 10*c* in the antenna module $\mathbf{264}_1$ arranged in the first right enclosure $\mathbf{146}_1$. The transmitter module 10*c* causes the transmit antennas 16*a*, 16*b*, to sequentially transmit the radar signals toward the first path $\mathbf{142}_1$. Next, the processor 90 supplies the trigger signal to the transmitter module 10*d* in the antenna module $\mathbf{264}_1$. The transmitter module 10*d* causes the transmit antennas 16*a*, to sequentially transmit the radar signals toward the first corridor $\mathbf{142}_1$.

When the transmit antennas 16 in the antenna module $\mathbf{262}_1$ transmit the radar signals, the processor 90 causes all of the receive antennas 26*a* to 26*p* in all of the receiver modules 20*a*, 20*b*, 20*c*, and 20*d* in the antenna module $\mathbf{262}_1$ to receive the reflected signals from the first path $\mathbf{142}_1$. Thus, the inspection of the first path $\mathbf{142}_1$ finishes.

Thereafter, the processor 90 supplies the trigger signal to the transmitter module 10*a* in the antenna module $\mathbf{262}_2$ arranged in the second left enclosure $\mathbf{144}_2$, for the inspection of the second path $\mathbf{142}_2$. The transmitter module 10*a* causes the transmit antennas 16*a*, 16*b*, to sequentially transmit the radar signals toward the second path $\mathbf{142}_2$. Next, the processor 90 supplies the trigger signal to the transmitter module 10*b* in the antenna module $\mathbf{262}_2$. The transmitter module 10*b* causes the transmit antennas 16*a*, to sequentially transmit the radar signals toward the second path $\mathbf{142}_2$. Next, the processor 90 supplies the trigger signal to the transmitter module 10*c* in the antenna module $\mathbf{264}_2$ arranged in the second right enclosure $\mathbf{146}_2$. The transmitter module 10*c* causes the transmit antennas 16*a*, 16*b*, to sequentially transmit the radar signals toward the second path $\mathbf{142}_2$. Next, the processor 90 supplies the trigger signal to the transmitter module 10*d* in the antenna module $\mathbf{264}_2$. The transmitter module 10*d* causes the transmit antennas 16*a*, to sequentially transmit the radar signals toward the second path $\mathbf{142}_2$.

When the transmit antennas 16 in the antenna module $\mathbf{262}_2$ transmit the radar signals, the processor 90 causes all of the receive antennas 26*a* to 26*p* in all of the receiver modules 20*a*, 20*b*, 20*c*, and 20*d* in the antenna module $\mathbf{262_2}$ to receive the reflected signals from the second path $\mathbf{142_2}$. Thus, the inspection of the second path $\mathbf{142_2}$ finishes.

In such a time division driving, when the number of the inspection lanes (paths) is increased, the available time of the inspection of each lane is restricted, decreasing the inspection efficiency. The same applies in the cases of the frequency division transmission and the code division transmission.

For avoiding this, it is proposed to perform inspections of a plurality of lanes simultaneously. FIG. 17 illustrates another example of the transmission/reception sequence of the inspection device 210 according to the embodiment. FIG. 17 shows an example of simultaneous transmission of the radar signals to a plurality of lanes. The processor 90 simultaneously drives the antenna module $\mathbf{262_1}$ arranged in the first left enclosure $\mathbf{144_1}$ and the antenna module $\mathbf{262_2}$ arranged in the second left enclosure $\mathbf{144_2}$, and then simultaneously drives the antenna module $\mathbf{264_1}$ arranged in the first right enclosure $\mathbf{146_1}$ and the antenna module $\mathbf{264_2}$ arranged in the second right enclosure $\mathbf{146_2}$.

In this specification, simultaneous is not limited to strict simultaneous, but includes a case where the timing of the start of driving the antenna module $\mathbf{264_1}$ in the first right enclosure $\mathbf{146_1}$ and the timing of the start of driving the antenna module $\mathbf{264_2}$ in the second right enclosure $\mathbf{146_2}$ are sifted by a few seconds. An example of the few seconds is two to three seconds.

More specifically, the processor 90 supplies the trigger signals to the transmitter modules 10*a* and 10*b* in the antenna module $\mathbf{262_1}$ arranged in the first left enclosure $\mathbf{144_1}$ and the transmitter modules 10*c* and 10*d* in the antenna module $\mathbf{264_1}$ arranged in the first right enclosure $\mathbf{146_1}$ for the inspection of the first path $\mathbf{142_1}$. Simultaneously, the processor 90 supplies the trigger signals to the transmitter modules 10*a* and 10*b* in the antenna module $\mathbf{262_2}$ arranged in the second left enclosure $\mathbf{144_2}$ and the transmitter modules 10*c* and 10*d* in the antenna module $\mathbf{264_2}$ arranged in the second right enclosure $\mathbf{146_2}$ for the inspection of the second path $\mathbf{142_2}$. Thus, the transmitter modules 10*a* and 10*b* in the antenna module $\mathbf{262_1}$ cause the antenna modules 16*a*, 16*b*, . . . to sequentially transmit the radar signals toward the first path $\mathbf{142_1}$, and the transmitter modules 10*c* and 10*d* in the antenna module $\mathbf{264_1}$ cause the antenna modules 16*a*, 16*b*, . . . to sequentially transmit the radar signals toward the first path $\mathbf{142_1}$.

When the transmit antennas 16 in the antenna modules $\mathbf{262_1}$ and $\mathbf{262_2}$ transmit the radar signals, the processor 90 causes all of the receive antennas 26 in the antenna modules $\mathbf{262_1}$ and $\mathbf{262_2}$ to receive the reflected signals.

By transmitting the radar signals simultaneously for a plurality of lanes in this manner, a decrease in the inspection efficiency can be avoided even when the signal generator module 30 is used in common for the inspection of a plurality of lanes.

Figure 18:
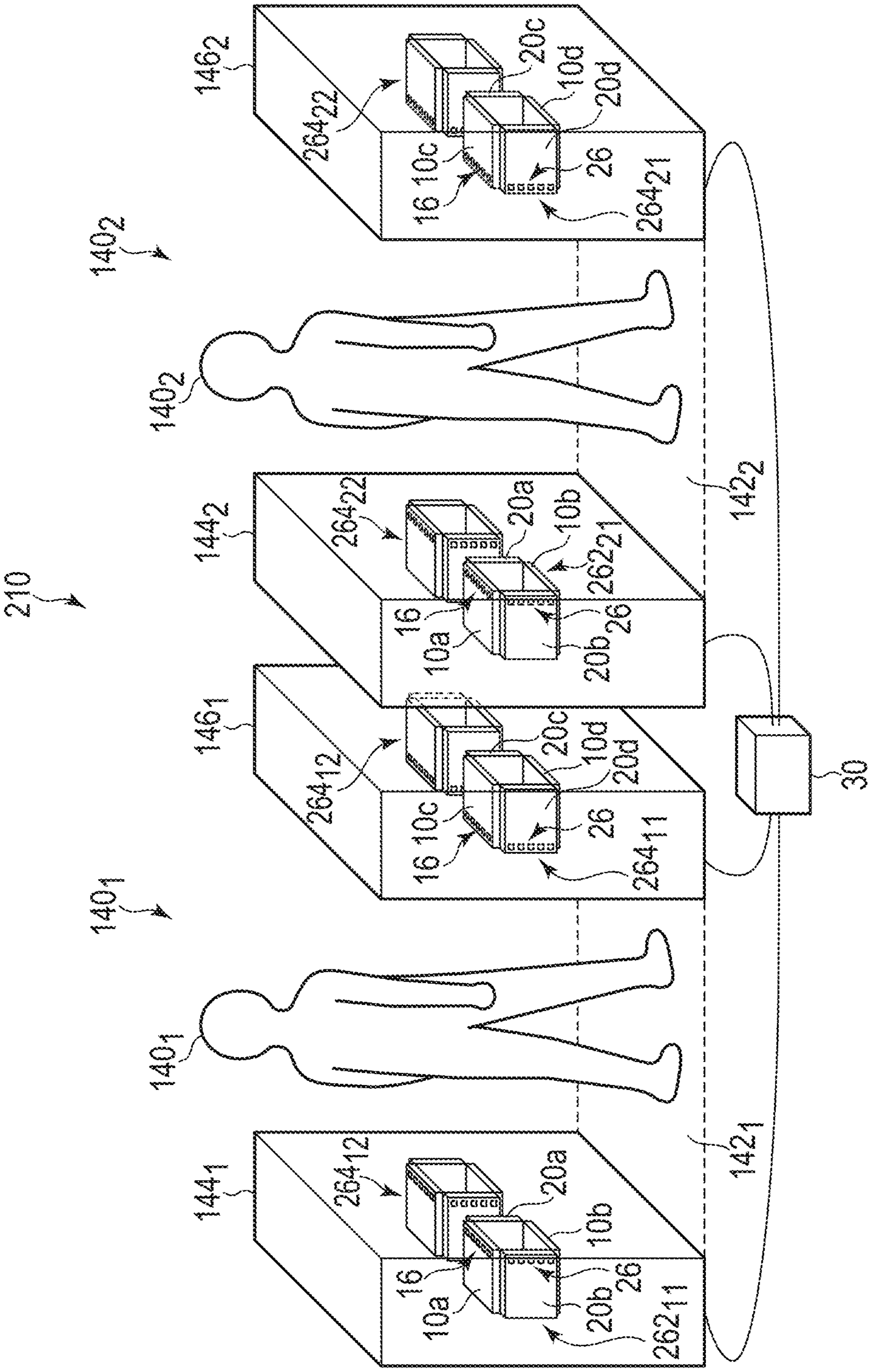
FIG. 18 is a perspective view illustrating a still another example of a walk-through type inspection device according to the embodiment.

FIG. 18 is a perspective view illustrating a still another example of the walk-through type inspection device 210 which is the application example of the radar device according to of the embodiment.

The first left side enclosure $\mathbf{144_1}$ includes two radar modules $\mathbf{262_{11}}$ and $\mathbf{262_{12}}$. Each of the radar modules $\mathbf{262_{11}}$ and $\mathbf{262_{12}}$ includes the transmitter modules 10*a* and 10*b* and the receiver modules 20*a* and 20*b* arranged in the cuboid shape. The arrangement of the transmitter modules 10*a* and 10*b* and the receiver modules 20*a* and 20*b* is the same as the arrangement in the example shown in FIG. 14. The radar modules $\mathbf{262_{11}}$ and $\mathbf{262_{12}}$ are arranged along the length direction of the path $\mathbf{142_1}$.

The right side enclosure $\mathbf{146_1}$ includes two radar modules $\mathbf{264_{11}}$ and $\mathbf{264_{12}}$. Each of the radar modules $\mathbf{264_{11}}$ and $\mathbf{264_{12}}$ includes the transmitter modules 10*c* and 10*d* and the receiver modules 20*c* and 20*d* arranged in the cuboid shape. The arrangement of the transmitter modules 10*c* and 10*d* and the receiver modules 20*c* and 20*d* is the same as the arrangement in the example shown in FIG. 14. The radar modules $\mathbf{264_{11}}$ and $\mathbf{264_{12}}$ are arranged along the length direction of the path $\mathbf{142_1}$.

The second left side enclosure $\mathbf{144_2}$ includes two radar modules $\mathbf{262_{21}}$ and $\mathbf{262_{22}}$. Each of the radar modules $\mathbf{262_{21}}$ and $\mathbf{262_{22}}$ includes the transmitter modules 10*a* and 10*b* and the receiver modules 20*a* and 20*b* arranged in the cuboid shape. The arrangement of the transmitter modules 10*a* and 10*b* and the receiver modules 20*a* and 20*b* is the same as the arrangement in the example shown in FIG. 14. The radar modules $\mathbf{262_{21}}$ and $\mathbf{262_{22}}$ are arranged along the length direction of the path $\mathbf{142_2}$.

The second right side enclosure $\mathbf{146_2}$ includes two radar modules $\mathbf{264_{21}}$ and $\mathbf{264_{22}}$. Each of the radar modules $\mathbf{264_{21}}$ and $\mathbf{264_{22}}$ includes the transmitter modules 10*c* and 10*d* and the receiver modules 20*c* and 20*d* arranged in the cuboid shape. The direction of the transmitter modules 10*c* and 10*d* and the receiver modules 20*c* and 20*d* is the same as the arrangement in the example shown in FIG. 14. The radar modules $\mathbf{264_{21}}$ and $\mathbf{264_{22}}$ are arranged along the length direction of the path $\mathbf{142_2}$.

In the inspection device 210 shown in FIG. 18, first, the radar modules $\mathbf{262_{11}}$, $\mathbf{264_{11}}$, $\mathbf{262_{21}}$, and $\mathbf{264_{21}}$ in the housings $\mathbf{144_1}$, $\mathbf{146_1}$, $\mathbf{144_2}$, and $\mathbf{146_2}$ located on the frontward side in the travel direction of the object 140 transmit and receive in the sequence shown in FIG. 16 or FIG. 17. Then, the radar modules $\mathbf{262_{12}}$, $\mathbf{264_{12}}$, $\mathbf{262_{22}}$, and $\mathbf{264_{22}}$ in the housings $\mathbf{144_1}$, $\mathbf{146_1}$, $\mathbf{144_2}$, and $\mathbf{146_2}$ located on the farther side in the travel direction of the object 140 transmit and receive in the sequences shown in FIG. 16 or FIG. 17.

When the radar module for the first path and the radar module for the second path simultaneously transmit the radar signals according to the transmission/reception sequence shown in FIG. 17, the radar module for the first path receives, according to the position of the object, the reflected signal of the radar signal transmitted by the radar module for the first path and the radar signal transmitted by the radar module for the second path or the reflected signal thereof, thus the interference may occur.

Figure 19:
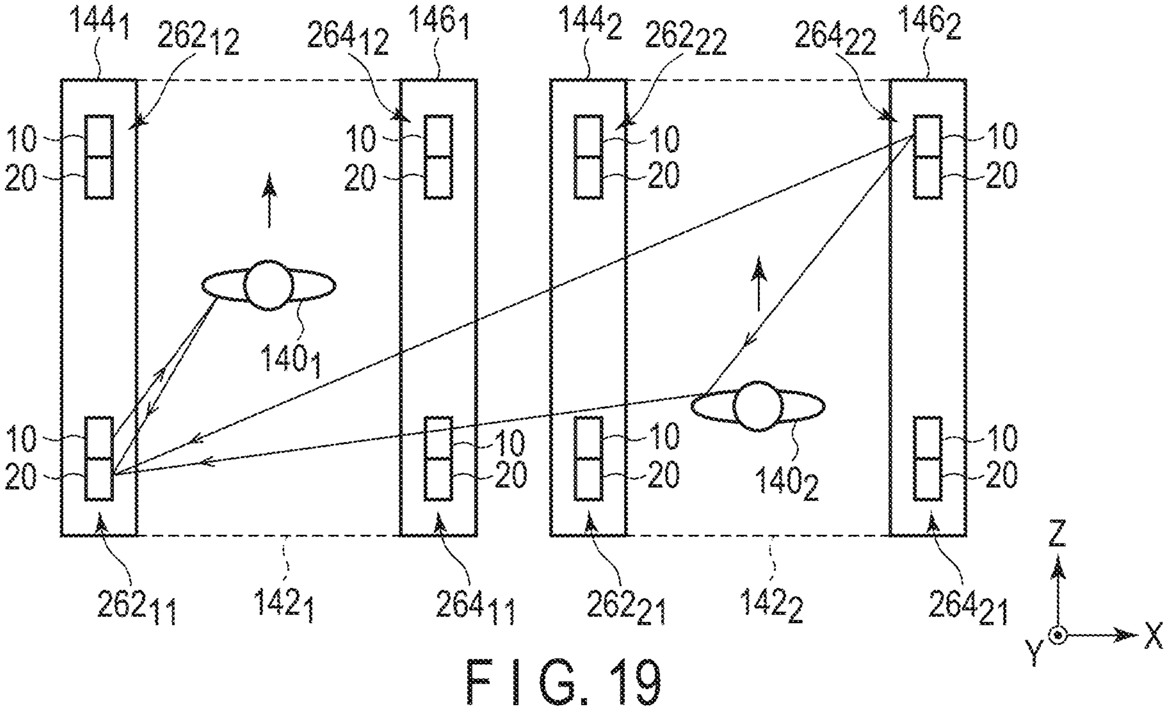
FIG. 19 illustrates a possible case where an interference occurs in the inspection device according to the still another example.

FIG. 19 illustrates a possible case where an interference occurs in the inspection device 210 according to the still another example. In the first path $\mathbf{142_1}$, the transmit antennas 16 of the transmitter modules 10 of the radar module $\mathbf{262_{11}}$ subsequently transmit the radar signals, and all of the receive antennas 26 of the receiver modules 20 of the radar module $\mathbf{262_{11}}$ receive the reflected signals of the radar signals. It is assumed that one transmit antenna 16 of the transmitter modules 10 of the radar module $\mathbf{264_{22}}$ transmits the radar signal in the second path $\mathbf{142_2}$ during the transmission of the radar signal for the inspection of the first path $\mathbf{142_1}$. The radar signal for the inspection of the second path $\mathbf{142_2}$ or the reflected signal thereof propagates to the first path $\mathbf{142_1}$ in some cases. When any of the receive antennas 26 of the receiver modules 20 of the radar module $\mathbf{262_{11}}$ for the inspection of the first path $\mathbf{142_1}$ receives the signal propagated from the second path $\mathbf{142_2}$ or the reflected signal thereof, the radar signal for the inspection of the second path $142_2$ or the reflected signal thereof interferes with the reflected signal for the inspection of the first path $142_1$.

Figure 20:
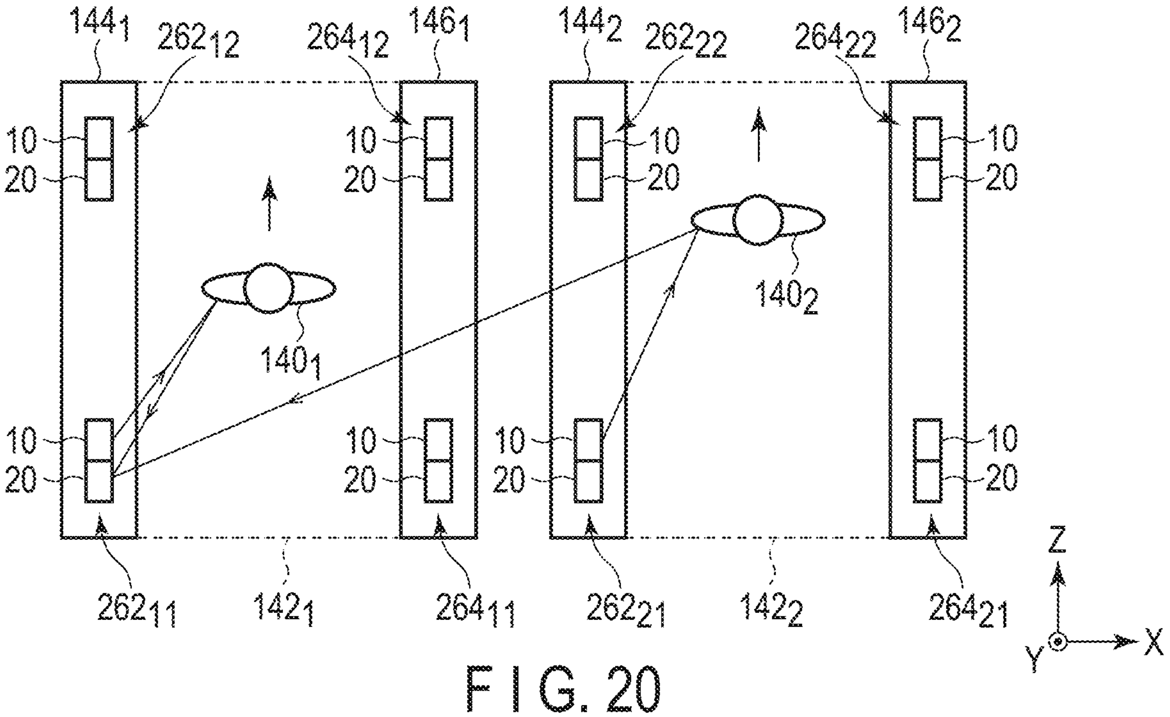
FIG. 20 illustrates another possible case where an interference occurs in the inspection device according to the still another example.

FIG. 20 illustrates another possible case where an interference occurs in the inspection device 210 according to the still another example. FIG. 20 illustrates an example in which one transmit antenna 16 of the transmitter modules 10 of the radar module $264_{21}$ transmits the radar signal in the second path $142_2$ and the reflected signal thereof propagates to the first path $142_1$ during the transmission of the radar signal for the inspection of the first path $142_1$. In this case as well, when any of the receive antennas 26 of the receiver modules 20 of the radar module $262_{11}$ for the inspection of the first path $142_1$ receives the reflected signal propagated from the second path $142_2$, the reflected signal for the inspection of the second path $142_2$ interferes with the reflected signal for the inspection of the first path $142_1$.

Figure 21:
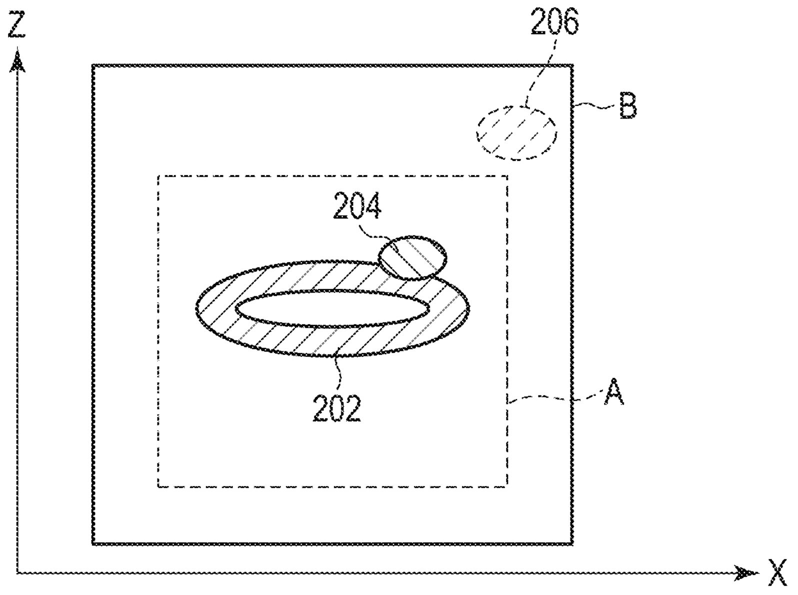
FIG. 21 is a diagram illustrating an example of an operation of the radar device in a state where an interference occurs.

FIG. 21 is a diagram illustrating an example of an operation of the radar device in a state where an interference occurs. The radar device measures the direction of the object, the distance to the object, and the like by emitting the radar signal to the object and observing the reflected signal (echo) of this radar signal. The intensity of the reflected signal is proportional to the distance to the object. The radar device receives a reflected signal having an intensity more than or equal to a predetermined intensity. The radar device cannot receive a reflected signal having an intensity less than the predetermined intensity. A detection area B indicating the reflected signal reflected at the object how farther can be received is set to the radar device.

The detection area B is an area in which the radar signal transmitted by the radar device can be observed and the direction of the object, the distance to the object, and the like can be measured. The detection area B is defined by a component in the X direction, which is the width direction of the path, and component in the Z direction, which is the length direction of the path. Since the electromagnetic wave is emitted to a three-dimensional space, the detection area B includes a component in the Y direction, which is the height direction of the path. However, for the sake of illustration, the detection area B in FIG. 21 will be described as a two-dimensional detection area at a certain coordinate y in the Y direction.

When the radar device receives a reflected signal other than the reflected signal of the object 140 (referred to as a clutter), the detection performance is decreased. This decrease in the detection performance due to the reception of the clutter is hereinafter referred to as an interference. As shown in FIG. 19 and FIG. 20, the radar signal or a reflected signal thereof from the radar module of an adjacent lane may be the clutter.

The radar device (image generation module 95) receives the reflected signal and performs the signal processing on the received signal to generate an image of an area in the detection area B. This image generation area is referred to as a sensing area A. The detection area B is determined based on a physical positional relationship between the transmitter module 10 and the receiver module 20. The sensing area A may be determined by an image generation algorithm of the image generation module 95. The detection area B is, for example, a six meter square area, and the sensing area A is, for example, a two meter square area.

It is assumed that the clutter occurs in the detection area B. When the origin of the clutter (reflection position of the clutter) is in the sensing area A, the image generation module 95 generates an image 204 based on the clutter. The processor 90 inspecting the belongings based on the image cannot determine whether the image 204 is based on the reflected signal of the object or based on the clutter. Therefore, when the origin of the clutter is in the sensing area A, a trouble occurs in the inspection of the belongings. When the origin of a clutter 206 is outside the sensing area A, the image generation module 95 does not generate an image based on the clutter. When the origin of the clutter is outside the sensing area A, a trouble does not occur in the inspection of the belongings.

Among combinations of radar modules transmitting radar signals for inspection of a lane and radar modules transmitting radar signals for inspection of a lane adjacent to the lane, a combination of radar modules that can perform simultaneous transmission without generating the cluster impeding the inspection of the belongings is present. Such a combination requires a radar module of a lane and at least one radar module of a lane adjacent to the lane. When designing the inspection device 210, a combination of the radar modules that can perform simultaneous transmission, among the radar modules in adjacent two lanes, is determined. A predetermined combination of the radar modules that can perform the simultaneous transmission is stored in the RAM 98 or the ROM 96 in the processor 90. When the scheduler 94 causes a radar module in the first lane to transmit the radar signal, the scheduler 94 causes at least one radar module that can perform the simultaneous transmission to transmit the radar signal, based on the information stored in the RAM 98 or the ROM 96.

Figure 22:
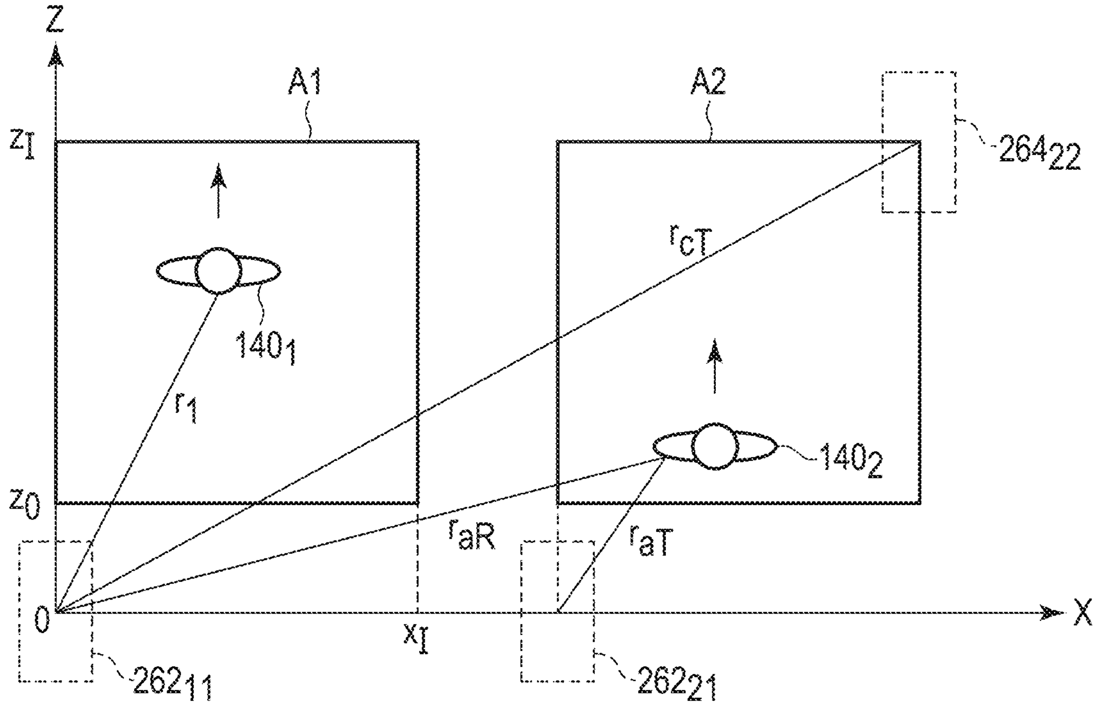
FIG. 22 is a diagram illustrating a condition under which an interference does not occur in the inspection device according to the still another example.

FIG. 22 is a diagram illustrating an example of two radar modules among the radar modules in two lanes where the origin of the clutter is not located in the sensing area A. A sensing area A1 of the radar device of the first lane is a rectangular area defined by $(0, z_0)$, $(x_I, z_0)$, $(x_I, z_I)$, $(0, z_I)$. An origin of the X-Z coordinate is the center of the radar module $262_{11}$ in the first lane. The size of a sensing area A2 of the radar device in the second lane is the same as that of the sensing area A1. The top sides of the sensing area A1 and the sensing area A2 have the same values in Z coordinate. The bottom sides of the sensing area A1 and the sensing area A2 have the same values in Z coordinate.

One transmit antenna in the radar module $262_{11}$ in the first lane transmits the radar signal. The radar signal transmitted from the radar module $262_{11}$ is reflected at an object $140_1$. All of the receive antennas in the radar module $262_{11}$ receive the reflected signals. A distance between the radar module $262_{11}$ and the object $140_1$ in the first lane is $r_1$.

It is assumed that, while the radar module $262_{11}$ transmits the radar signal, either the radar module $264_{22}$ or the radar module $264_{21}$ in the second lane transmits the radar signal. The radar signal transmitted by the radar module $264_{22}$ is propagated to the first lane. The radar signal transmitted from the radar module $264_{21}$ is reflected at an object $140_2$. The reflected signal is propagated to the first lane. The radar module $262_{11}$ receives either the radar signal transmitted from the radar module $264_{22}$ or the reflected signal of the radar signal transmitted from the radar module $264_{21}$.

A distance between the radar module $264_{22}$ transmitting the radar signal and the radar module $262_{11}$ receiving the radar signal is $r_{cT}$. A distance between the radar module $262_{21}$ transmitting the radar signal and a reflection point of the object $140_2$ is $r_{aT}$. A distance between the reflection point of the object $140_2$ and the radar module $262_{11}$ receiving the radar signal is $r_{aR}$. The radar module $264_{22}$ is farther from the radar module $262_{11}$ than the sensing area A1.

When the position of the radar module $262_{11}$ and the position of the radar module $264_{22}$ satisfy Equation 1, a direct wave from the radar module $264_{22}$ does not enter the sensing area A1 of the first lane and an image of the first lane does not include a component based on the direct wave of the radar module $264_{22}$. Examples of positions of the radar module include the center of the substrate, the center of the MIMO antenna, and the like. The center of the MIMO antenna may be defined by the center between the transmit antenna array and the receive antenna array. Therefore, even when two radar signals are simultaneously transmitted from the transmit antenna of the radar module $262_{11}$ and the transmit antenna of the radar module $264_{22}$, the clutter does not impede the detection of the belongings.

$$\sqrt{x_I^2 + z_I^2} < \frac{r_{CT^\circ}}{2} \quad \text{Equation 1}$$

Equation 1 indicates a condition under which the direct wave from the second lane does not interfere with the sensing area A1 of the first lane.

When the position of the transmit antenna transmitting the radar signal of the radar module $262_{11}$ and the position of the transmit antenna transmitting the radar signal of the radar module $264_{21}$ satisfy Equation 2, a reflected wave of the radar signal from the transmit antenna of the radar module $264_{21}$ does not enter the sensing area A1 of the first lane and an image of the first lane does not include a component based on the reflected wave of the radar signal of the radar module $264_{21}$. Therefore, even when two radar signals are simultaneously transmitted from the transmit antenna of the radar module $262_{11}$ and the transmit antenna of the radar modules $264_{21}$, the clutter does not impede the detection of the belongings.

$$\sqrt{x_I^2 + z_I^2} < \frac{r_{CT^\circ} + r_{aR^\circ}}{2} \quad \text{Equation 2}$$

Equation 2 indicates a condition under which the reflected wave of the radar signal transmitted from the second lane does not interfere with the sensing area A1 of the first lane.

When designing the inspection device 210, a combination of the transmit antennas satisfying Equations 1 and 2 is determined based on the positions of the radar modules 262 and 264.

A distance included in Equation 2 varies in accordance with the position of the object $140_2$. The distance included in Equation 2 becomes the smallest when the object $140_2$ is located at the entrance of the path (location where the Z coordinate of the sensing area A2 is $z_0$). When the condition of Equation 2 is satisfied in a case where the distance is the smallest, the condition of Equation 2 is satisfied in the case where the distance is not the smallest. Therefore, the right side of Equation 2 is a value in a case where the object $140_2$ is located at the entrance of the path.

An example of two radar modules satisfy both Equation 1 and Equation 2 is two radar modules with transmission/reception directions not opposing to each other. For example, the transmission/reception directions of the radar modules $264_{11}$ and $264_{12}$ in the right side enclosure $146_1$ of the first path $142_1$ are to the left. The transmission/reception direction of the radar modules $262_{21}$ and $262_{22}$ in the left side enclosure $144_2$ of the second path $142_2$ are to the right. In other words, the transmission/reception directions of these modules are not opposed to each other. Even when the radar signals are simultaneously transmitted from the radar modules $264_{11}$ and $264_{12}$ and the radar modules $262_{21}$ and $262_{22}$, the interference does not occur in the sensing area.

Figure 23:
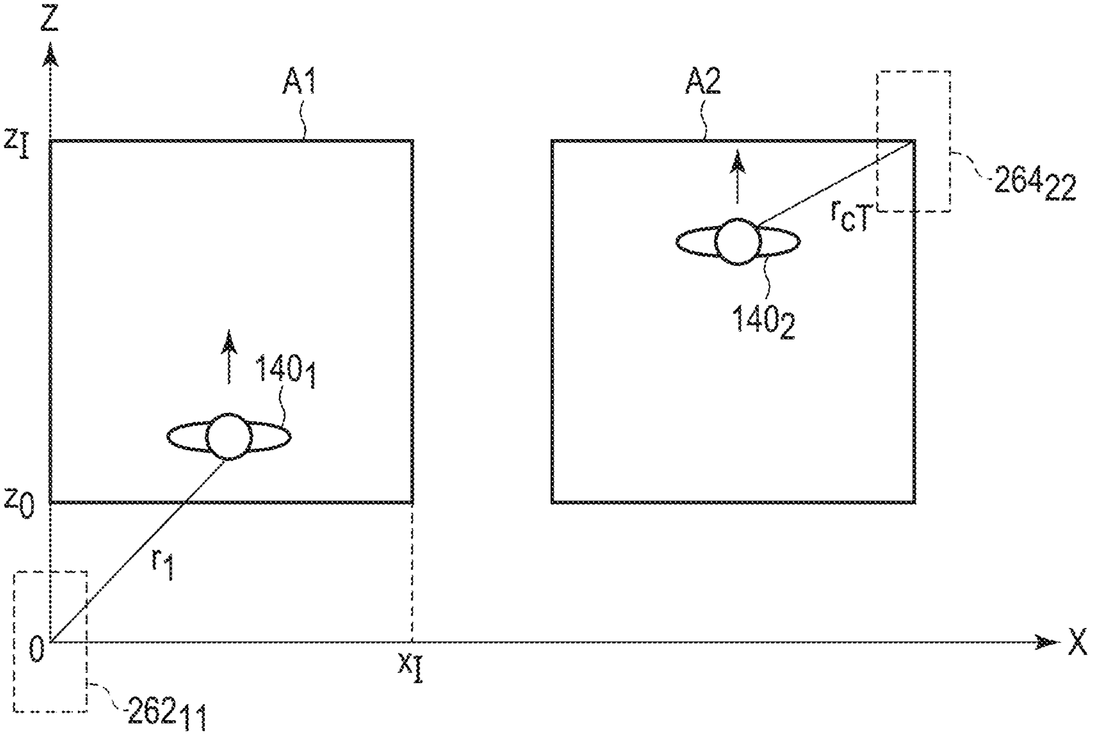
FIG. 23 is a diagram illustrating another condition under which an interference does not occur in the inspection device according to the still another example.

FIG. 23 is a diagram illustrating another example of two radar modules where the origin of the clutter is not located in the sensing area A, among the radar modules in adjacent two lanes. It is assumed that the object $140_1$ in the first lane is located on a frontward side of the path (position having a small value in Z-coordination). The radar module $262_{11}$ of the first lane inspects the backside of the object $140_1$. It is assumed that the object $140_2$ in the second lane is located on a farther side of the path (position having a large value in Z-coordination). The radar module $264_{22}$ of the second lane inspects the front side of the object $140_2$.

The object $140_2$ is located between the radar module $264_{22}$ and the radar module $262_{11}$. In other words, the radar signal from the radar module $264_{22}$ is not propagated to the radar module $262_{11}$ due to the interruption by the object $140_2$ and thus is not received by the radar module $262_{11}$. Therefore, even when the radar module $262_{11}$ and the radar module $264_{22}$ simultaneously transmit the radar signals, the clutter does not impede the detection of the belongings. Since the object 140 travels, the object $140_1$ is located between the radar module $264_{22}$ and the radar module $262_{11}$ in some time periods. In these cases as well, the clutter does not impede the inspection of the belongings even the transmitted signals are simultaneously transmitted by the radar module $262_{11}$ and the radar module $264_{22}$.

A combination of the radar modules satisfying the condition shown in FIG. 23 is determined based on position of the object 140 while the inspection device is in operation. The position of the object 140 is obtained by a camera, a sensor, and the like separately provided on the inspection device. In accordance with the position of the object 140 obtained by the camera, the sensor, and the like, the scheduler 94 determines a combination of the radar modules that can perform transmission simultaneously and causes the plurality of radar modules to simultaneously transmit the radar signals.

Figure 24:
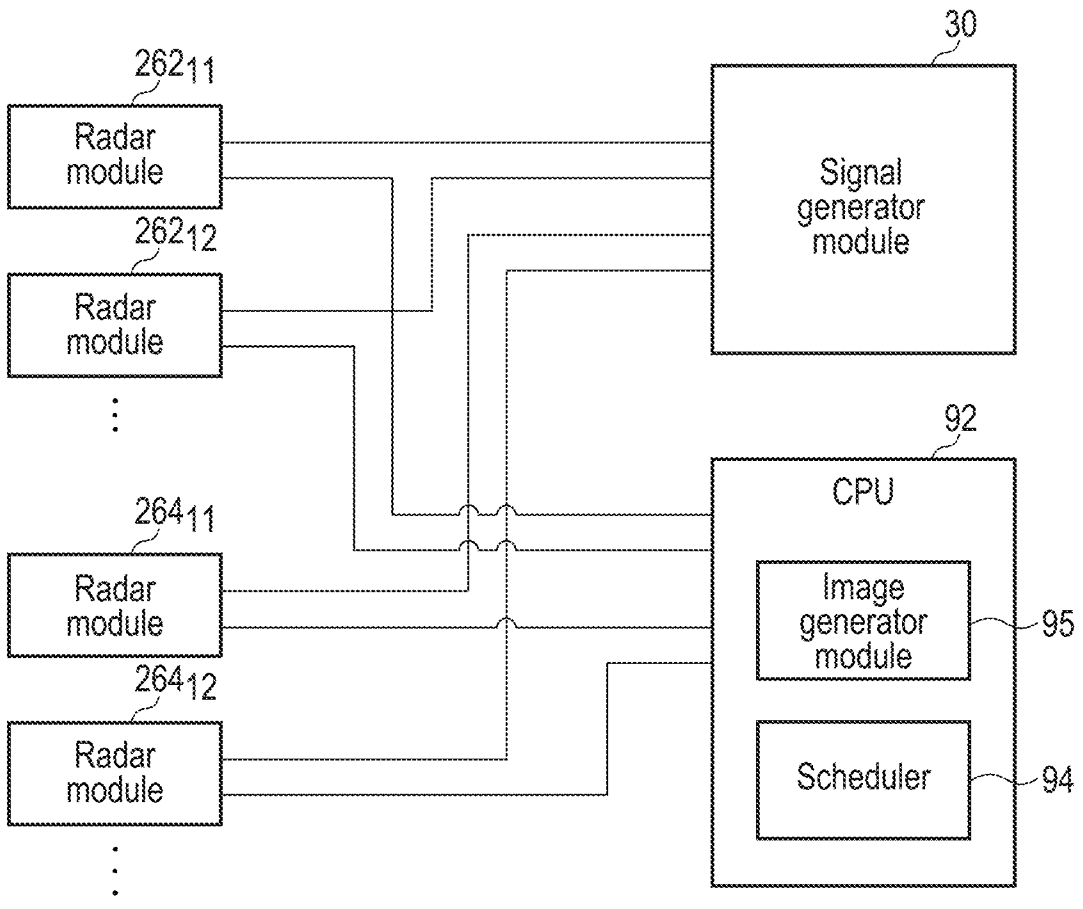
FIG. 24 is a view illustrating an example of an electronic circuit of the inspection device according to the embodiment.

FIG. 24 is a view illustrating an example of an electronic circuit of the inspection device 120 according to the embodiment in which simultaneous transmission is achievable. The signal generation module 30 and the CPU 92 (scheduler 94 and image generation module 95) are connected to each of the radar modules 262 in the left side enclosure 144 of each of the lanes and each of the radar modules 264 in the right side enclosure 146 of each of the lanes.

Figure 25:
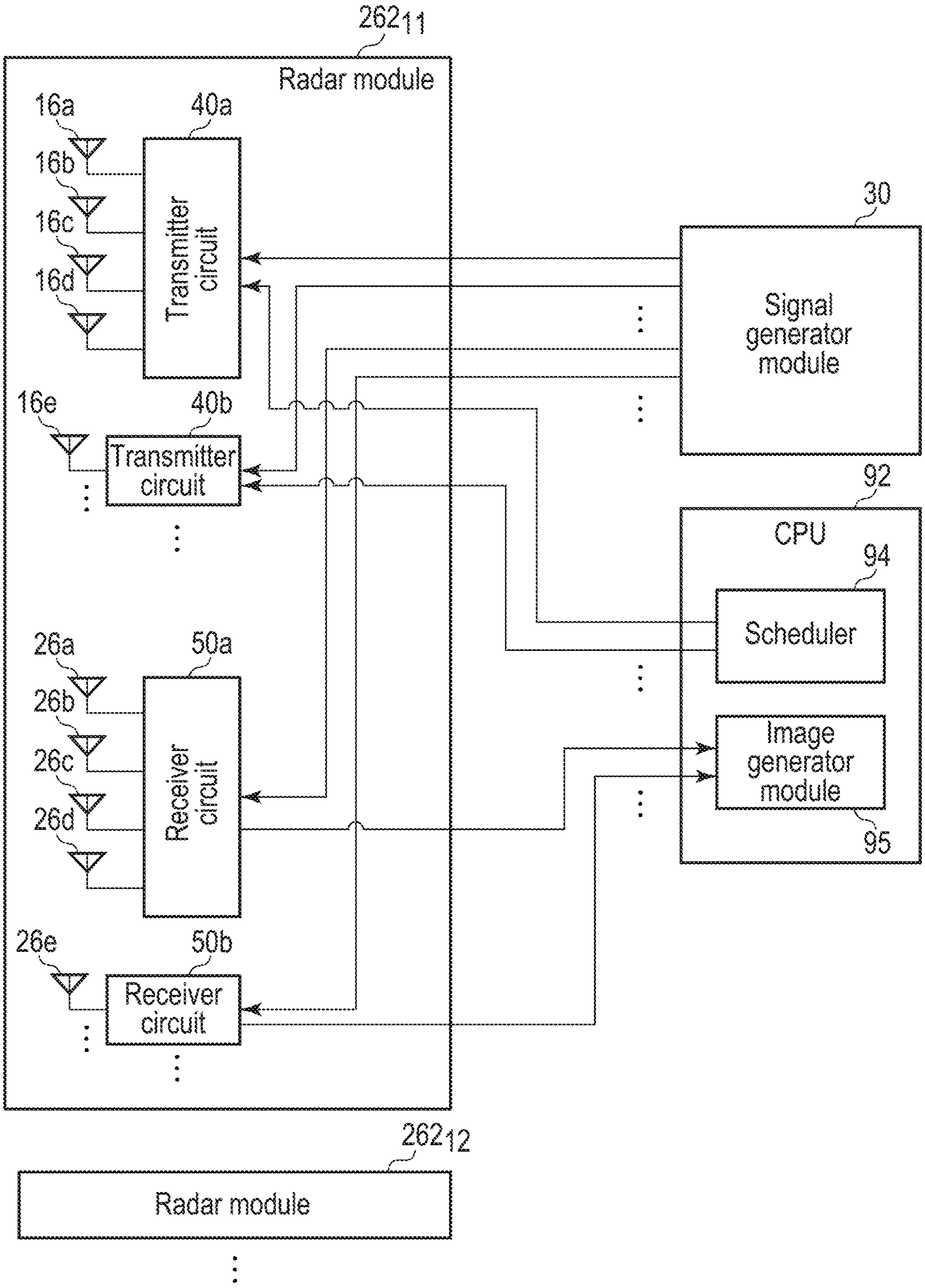
FIG. 25 is a view illustrating a detailed example of an electronic circuit of the inspection device according to the embodiment.

FIG. 25 is a diagram illustrating details of the radar module 262 in FIG. 24. Each of the radar modules 262 and 264 includes the transmitter circuits 40 (FIG. 2) and the receiver circuits 50 (FIG. 2). Each of the transmitter circuits 40 is connected to four transmit antennas 16. Each of the receiver circuits 50 is connected to four receiver antennas 26.

The clock signal and the chirp signal that are generated by the signal generation module 30 are supplied to the transmitter circuit 40 and the receiver circuit 50 of a lane. The clock signal generated by the signal generation module 30 is supplied to the receiver circuit 50.

The scheduler 94 sequentially supplies the trigger signals to the transmitter circuit 40. When the scheduler 94 supplies the trigger signal to the transmitter circuit 40 of a lane, the scheduler 94 supplies the trigger signal to the transmit antennas of the radar module of another lane that satisfies Equation 1 and Equation 2 stored in the ROM 96 or the RAM 98.

The receiver circuit 50 amplifies the reflected signals received by all of the receive antennas 26, converts the signals to the IF signals by mixing with the chirp signal, and supplies the digital signals of the IF signals to the image generation module 95.

According to the present embodiment, it is achieved the radar system in which the radar devices are arranged in the lanes and operate in synchronization by the same clock signal for improving the inspection throughput. Therefore, the timings of the radar transmissions unknown among the radar devices become known. When the transmissions are performed among the radar devices, radar modules that do not cause the interference in the sensing area simultaneously transmit the radar signals. Therefore, the radar devices can be controlled by the common clock signal generation module, and thus it is not necessary to provide a signal generation module per each of the radar devices. In addition, since it is possible to perform simultaneous inspection while minimizing the interference among the radar devices, the inspection throughput is improved.

A large number of antennas are required to inspect an object in a large area. In the present embodiment, a Multiple-Input and Multiple-Output (MIMO) antenna including an antenna array are used as the transmit antennas 16 and the receive antennas 26. Each of the transmit antennas transmits the radar signal by the time division. The reflected signals of the radar signal are simultaneously received by all of the receive antennas. Thus, a large number of reflected signals can be received by a small number of antennas, reducing the number of antennas. The present embodiment can be applied to radar devices that do not use the MIMO antennas as well.

Although the processor 90 is connected to the transmitter module 10, the receiver module 20, and the signal generation module 30 and performs the transmission control and the image generation, the configuration of the processor 90 can be changed variously. For example, the processor 90 may be connected to an external server, the image generation module 95 may be omitted from the processor 90 and may be provided on the server.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A radar system comprising:

first radar modules capable of transmitting first radar signals to a first area, respectively, and capable of receiving first reflected signals obtained by reflection of the first radar signals by a first inspection target in the first area;

second radar modules capable of transmitting second radar signals to a second area, respectively, and capable of receiving second reflected signals obtained by reflection of the second radar signals by a second inspection target in the second area; and a processor configured to control transmission timings of the first radar modules and transmission timings of the second radar modules, wherein:

the processor is configured to cause one of the first radar modules to transmit one first radar signal and cause at least one second radar module of the second radar modules to transmit at least one second radar signal;

a distance between the one of the first radar modules and the at least one second radar module is twice or more as long as a distance between the one of the first radar modules and a point farthest from the one of the first radar modules in a sensing area of the one of the first radar modules, wherein the sensing area is in the first area and is smaller than the first area;

the one of the first radar modules is capable of receiving the second radar signals and the second reflected signals and is configured to generate an image of a rectangular area including the first inspection target based on the first reflected signals, the second radar signals, and the second reflected signals; and the image does not include a component based on the at least one second radar signal transmitted by the at least one second radar module and a component based on the second reflected signal of the at least one second radar signal.

2. The radar system of claim 1, wherein:

the first radar modules and the second radar modules are opposed to each other; and the first area and the second area are located between the first radar modules and the second radar modules.

3. The radar system of claim 1, further comprising:

a pair of first housings arranged in the first area; and a pair of second housings arranged in the second area, wherein:

the first radar modules are arranged in at least one of the pair of first housings; and the second radar modules are arranged in at least one of the pair of second housings.

4. The radar system of claim 1, wherein:

the first radar modules and the second radar modules comprise Multiple-Input and Multiple-Output (MIMO) radars; and each of the MIMO radars comprises transmit antennas and receive antennas.

5. The radar system of claim 1, wherein;

the at least one second radar module is located farther from the rectangular area as viewed from the one of the first radar modules.

6. The radar system of claim 1, wherein:

a half of the distance between the one of the first radar modules and the at least one second radar module is longer than a diagonal of the rectangular area generated by the one of the first radar modules.

7. The radar system of claim 1, wherein a half of a sum of a distance between the one of the first radar modules and the second inspection target and a distance between the at least one second radar module and the second inspection target is longer than a diagonal of the rectangular area generated by the one of the first radar modules.

8. The radar system of claim 1, wherein;

at least one of the first inspection target or the second inspection target is located between the one of the first radar modules and the at least one second radar module.

9. The radar system of claim 1, further comprising:

a determination unit configured to determine the one of the first radar modules and the at least one second radar module based on positions of the first radar modules and positions of the second radar modules.

10. The radar system of claim 9, further comprising:

a sensor configured to measure a position of the first inspection target and a position of the second inspection target, wherein the determination unit is configured to determine the one of the first radar modules and the at least one second radar module based on the positions of the first radar modules, the positions of the second radar modules, and an output from the sensor.

11. A method for a radar system comprising first radar modules capable of transmitting first radar signals to a first area, respectively, and capable of receiving first reflected signals obtained by reflection of the first radar signals by a first inspection target in the first area, and second radar modules capable of transmitting second radar signals to a second area, respectively, and capable of receiving second reflected signals obtained by reflection of the second radar signals by a second inspection target in the second area, the method comprising:

causing one of the first radar modules to transmit one first radar signal; and causing at least one second radar module of the second radar modules to transmit at least one second radar signal, wherein:

a distance between the one of the first radar modules and the at least one second radar module is twice or more as long as a distance between the one of the first radar modules and a point farthest from the one of the first radar modules in a sensing area of the one of the first radar modules, wherein the sensing area is in the first area and is smaller than the first area;

the one of the first radar modules is capable of receiving the second radar signals and the second reflected signals and is configured to generate an image of a rectangular area including the first inspection target based on the first reflected signals, the second radar signals, and the second reflected signals; and the image does not include a component based on the at least one second radar signal transmitted by the at least one second radar module and a component based on the second reflected signal of the at least one second radar signal.

12. A non-transitory computer-readable storage medium storing a computer program which is executable by a computer for controlling a radar system comprising first radar modules capable of transmitting first radar signals to a first area, respectively, and capable of receiving first reflected signals obtained by reflection of the first radar signals by a first inspection target in the first area, and second radar modules capable of transmitting second radar signals to a second area, respectively, and capable of receiving second reflected signals obtained by reflection of the second radar signals by a second inspection target in the second area, wherein the program causes the computer to execute functions comprising:

causing one of the first radar modules to transmit one first radar signal; and causing at least one second radar module of the second radar modules to transmit at least one second radar signal, and wherein a distance between the one of the first radar modules and the at least one second radar module is twice or more as long as a distance between the one of the first radar modules and a point farthest from the one of the first radar modules in a sensing area of the one of the first radar modules, wherein the sensing area is in the first area and is smaller than the first area;

the one of the first radar modules is capable of receiving the second radar signals and the second reflected signals and is configured to generate an image of a rectangular area including the first inspection target based on the first reflected signals, the second radar signals, and the second reflected signals; and the image does not include a component based on the at least one second radar signal transmitted by the at least one second radar module and a component based on the second reflected signal of the at least one second radar signal.

* * * * *